(12) United States Patent
Thillainadarajah et al.

(10) Patent No.: US 9,488,538 B2
(45) Date of Patent: Nov. 8, 2016

(54) PRESSURE MAPPING AND ORIENTATION SENSING SYSTEM

(71) Applicant: Smart Skin Technologies, Inc., Fredricton (CA)

(72) Inventors: Kumaran Thillainadarajah, Fredricton (CA); Arpad Kormendy, Fredricton (CA); Adam Joseph MacDonald, Fredricton (CA)

(73) Assignee: Smart Skin Technologies, Inc. (CA)

( * ) Notice: Subject to any disclaimer, the term of this patent is extended or adjusted under 35 U.S.C. 154(b) by 3 days.

(21) Appl. No.: 14/375,331

(22) PCT Filed: Jan. 31, 2013

(86) PCT No.: PCT/CA2013/050076
§ 371 (c)(1),
(2) Date: Jul. 29, 2014

(87) PCT Pub. No.: WO2013/113122
PCT Pub. Date: Aug. 8, 2013

(65) Prior Publication Data
US 2014/0366650 A1 Dec. 18, 2014

Related U.S. Application Data

(60) Provisional application No. 61/592,632, filed on Jan. 31, 2012, provisional application No. 61/733,453, filed on Dec. 5, 2012.

(51) Int. Cl.
*G01L 1/10* (2006.01)
*G01L 1/26* (2006.01)
(Continued)

(52) U.S. Cl.
CPC .............. *G01L 1/26* (2013.01); *A63B 69/36* (2013.01); *G01L 1/18* (2013.01); *G01L 5/008* (2013.01); *G09B 19/0038* (2013.01); *A63B 49/08* (2013.01); *A63B 53/14* (2013.01); *A63B 2060/464* (2015.10); *A63B 2220/56* (2013.01); *A63B 2220/833* (2013.01); *A63B 2225/50* (2013.01)

(58) Field of Classification Search
CPC ........... G01L 1/18; G01L 1/26; G01L 5/228; A63B 2060/464; A63B 2220/56
USPC ...................... 73/862.391, 862.625, 862.946
See application file for complete search history.

(56) References Cited

U.S. PATENT DOCUMENTS 5,054,323 A 10/1991 Hubbard, Jr. et al.
5,079,949 A * 1/1992 Tamori .................... G06F 3/045
338/99
(Continued)

FOREIGN PATENT DOCUMENTS

| CN | 102589759 A | 7/2012 |
|---|---|---|
| EP | 0087264 | 7/1984 |
| WO | 2010/122996 A1 | 10/2010 |

OTHER PUBLICATIONS

International Search Report and Written Opinion, International Application No. PCT/CA2013/050076, mailed on Aug. 14, 2014, 8 pages.

*Primary Examiner* — Max Noori
(74) *Attorney, Agent, or Firm* — Lewis Rice LLC

(57) ABSTRACT

This disclosure if directed to an improved pressure, force, and orientation sensing system, which may be applied to various industrial articles or sports equipment, fore remote performance analysis and user interface. Where applied to sports equipment, including a golf club, the sensor array of flexible and resilient piezo-resistive material permits collection of grip force data for an array of positions around and along the golf club grip handle; for the analysis, processing and communication of the data once collected, and a method of providing automated golf instruction using a force sensing golf grip of the present invention. Where applied to improved manufacturing lines and shipping of containers, force sensing packages may be equipped with the sensor arrays disclosed herein. The force sensing package is of similar shape to a standard sized package the ordinary forces on which are being tested and by the sampled force sensing package. Control and display software collects the force sensing data, and possibly other data (including motion and orientation data), and communicates it to analytics and display software remote from the device. The force sensing package is comprised of layers, at least two of the layers of which is a force sensing material and a related electrode array. Shapes disclosed are cylinders (cans), cylinders with conic portions (bottle), and parallelepipeds (boxes).

20 Claims, 23 Drawing Sheets

(51) Int. Cl.
*A63B 69/36* (2006.01)
*G01L 1/18* (2006.01)
*G09B 19/00* (2006.01)
*G01L 5/00* (2006.01)
*A63B 49/08* (2015.01)
*A63B 53/14* (2015.01)

(56) References Cited

U.S. PATENT DOCUMENTS

| | | |
|---|---|---|
| 5,439,217 A | 8/1995 | Ganger, Sr. |
| 6,033,370 A | 3/2000 | Reinbold et al. |
| 6,125,686 A | 10/2000 | Haan et al. |
| 6,716,034 B2 | 4/2004 | Casanova, Jr. et al. |
| 7,174,277 B2 | 2/2007 | Vock et al. |
| 7,219,033 B2 | 5/2007 | Kolen |
| 7,401,525 B2 | 7/2008 | Cobianu et al. |
| 7,726,197 B2 | 6/2010 | Selvan et al. |
| 8,033,916 B2 | 10/2011 | Caldwell et al. |
| 2009/0256817 A1* | 10/2009 | Perlin .................. G06F 3/0233 345/174 |
| 2011/0096025 A1* | 4/2011 | Slobodin ................ G06F 3/044 345/174 |
| 2011/0260994 A1 | 10/2011 | Saynac et al. |
| 2012/0055257 A1 | 3/2012 | Shaw-Klein |
| 2015/0130762 A1* | 5/2015 | Wang .................. G06F 3/0416 345/174 |

\* cited by examiner

Figure 4
(a)
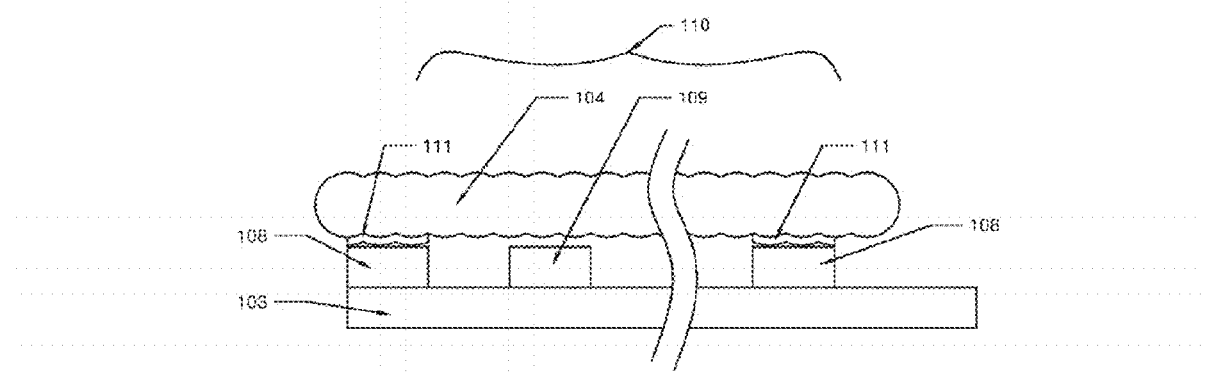
(b)
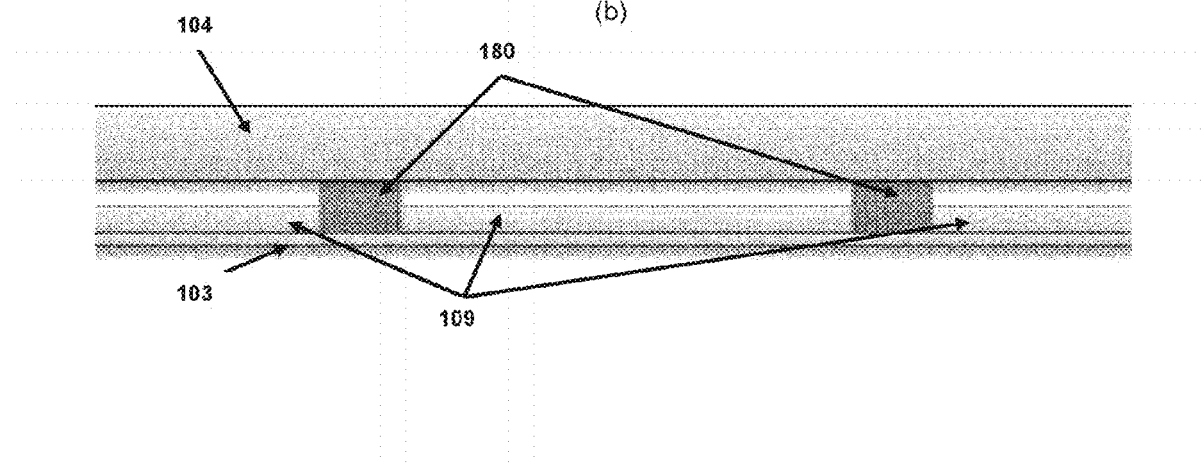

Figure 6
(a)
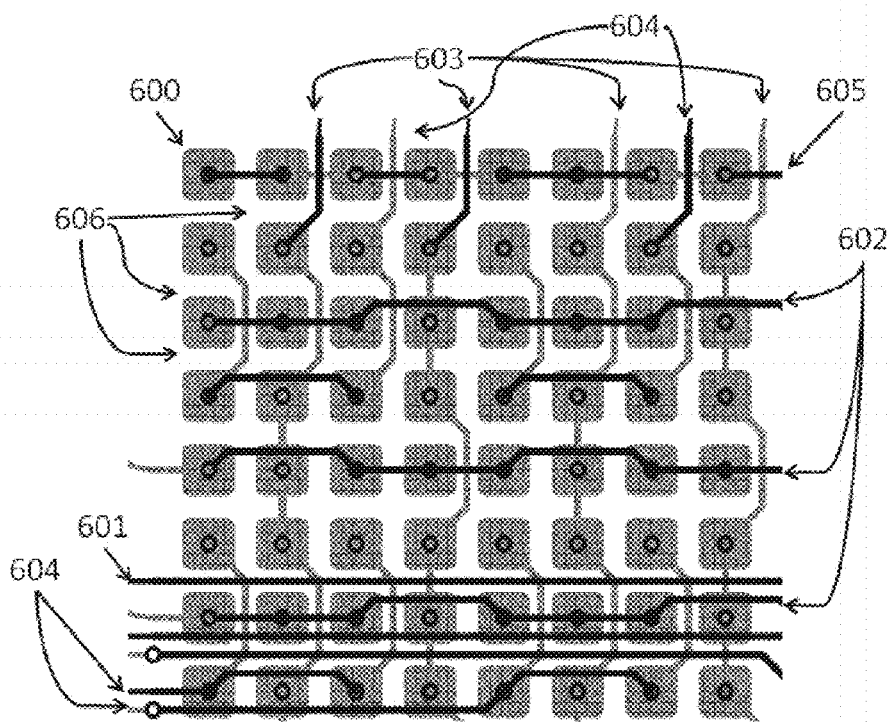
(b)
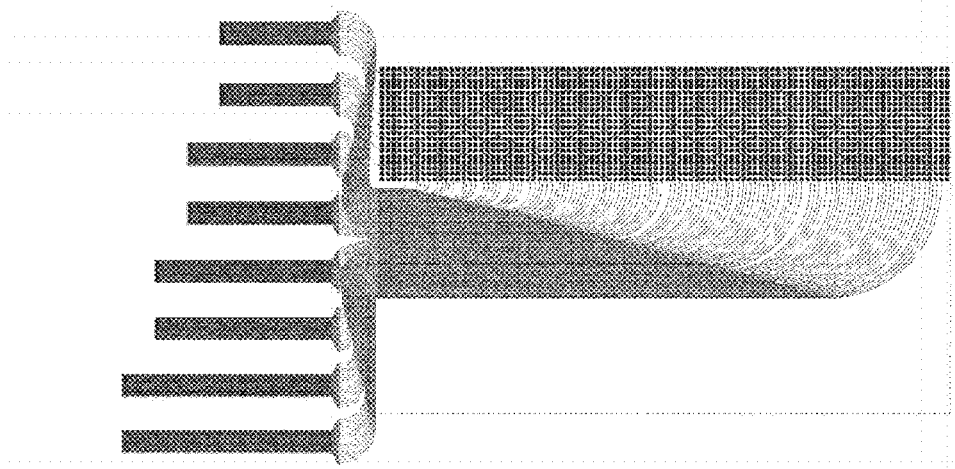

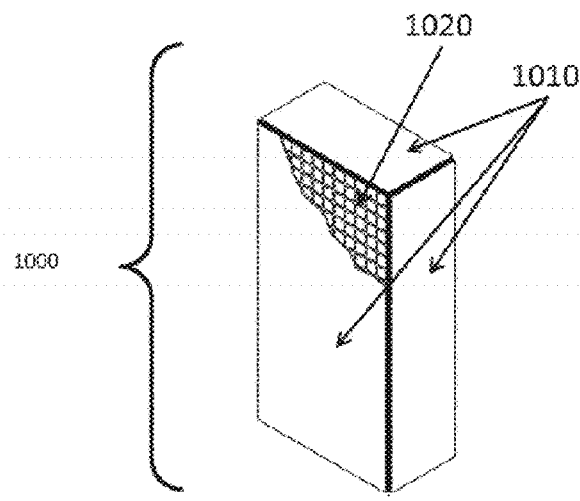
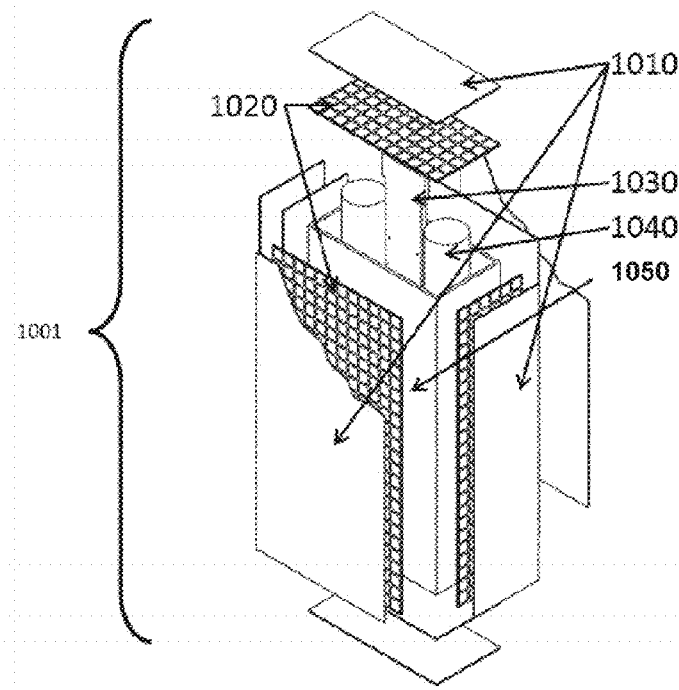
Figure 10

PRESSURE MAPPING AND ORIENTATION SENSING SYSTEM

CROSS REFERENCE TO RELATED APPLICATION(S)

This application is a §317 U.S. National Phase of International Application Ser. No.: PCT/CA2013/050076 filed Jan. 31, 2013, which is turn claims the benefit of U.S. Provisional Patent Application Ser. No: 61/592,632, filed Jan. 31, 2012, and U.S. Provisional Patent Application Ser. No: 61/733,453, filed Dec. 5, 2012. The entire disclosure of all the above documents is herein incorporated by reference.

FIELD

The present disclosure relates to pressure (force) mapping and orientation sensors (pressure, force and orientation sensing meters) applied to industrial articles and sports equipment, and integrated systems for remote performance analysis and user interface.

BACKGROUND

There is an opportunity to deploy pressure sensing materials in certain areas of manufacture or sports, where the handling, orientation and motion of an object may be important to overall system or user performance. Two areas of interest are the progress of goods during manufacturing and shipment, and the manner and strength by which sports equipment may be held and the resulting effect on performance.

Due to a market need to improve the quality and quantity of goods produced and shipped to market, various systems and methods exist to measure, store, transmit and display data related to goods during production or in shipment.

U.S. Pat. No. 6,125,686 issued Oct. 3, 2000 to Han and McNally for an "Impact Measuring Device for Delicate and Fragile Articles" discloses a real time data collection and transmission method which uses accelerometers embedded in devices to measure impacts.

U.S. Pat. No. 7,174,277, "Product Integrity Systems and Associated Methods" issued to Vock, et al., on Feb. 6, 2007, provides a movement monitor device for adhesion to industrial articles during shipment, which measures impact as well as other environmental parameters.

However, known devices do not currently use pressure sensing material to track and monitor the progress of goods during manufacturing or shipping. Diagnostic tools do not currently determine in a reliable way either the nature and general direction of force applied to an article or whether, where and how hard an article is contacted, during a manufacturing line or in shipping or handling.

There is a need for this information to help optimize the processes, and provide appropriate protection to articles.

Learning how to or teaching some to properly operate a piece of sports equipment is critical to performance and enjoyment of the game. In golf, learning how to or teaching some to properly swing a golf club is acknowledged as a difficult task, and enjoyment of golf by novice golfers is often impeded by inconsistent or incorrect club positioning or how the golf club is gripped. Professional golfers may be interested in more quantitative analysis of their hand position and dynamic grip pressure on a club throughout their swing for training purposes. There is also a desire to provide a quantitative basis on which fit of golf club grips for a user's natural grip may be determined. Those same principles would apply in other sports like cricket, tennis, badminton, hockey, baseball and other sports involving a club, stick, bat or racket.

U.S. Pat. No. 6,033,370 "Capacitative Sensor" issued to Reinbold et al. on Mar. 7, 2000, U.S. Pat. No. 6,716,034 "Grip Pressure Detector Assembly", issued to Casanova, Jr. et al., on Apr. 6, 2004, and U.S. Pat. No. 8,033,916 "Grip Pressure Sensor", issued to Caldwell and Chen on Oct. 11, 2011, each discloses the general use of force sensitive gauges in sports equipment, including golf club grips to provide grip assistance. However, the inventions disclosed therein either: use non-robust threshold based sensing materials incapable of accurate pressure sensation and incapable of distinguishing where, when and how hard the user is applying pressure along the club grip or even differential measurements of pressure at multiple locations; or (in the case of U.S. Pat. No. 6,716,034) require modifications to the handle to accommodate steel strain gauges.

U.S. Pat. No. 7,219,0338 issued to Kolen on May 15, 2007, discloses electronic orientation sensors within or upon golf clubs and other objects, without any corresponding grip pressure measurements or analysis.

Existing tools are able to help a golfer tell whether a club is being held too tightly in a global sense, but not where it is being held too tightly, or where it might also be being held too loosely or simply inappropriately. A similar tool would be of interest in baseball, cricket, hockey, racquet sports, video game controllers and other devices where the manner in which the object is held affects performance of the user.

There is a need for a robust pressure sensing golf grip which obtains a plurality of pressure measurements in relation to a golf swing for improved swing coaching.

There is a need for a golf grip which uses flexible, state-of the art multi-touch technology in a novel way.

There is a need for a robust analytical tool for obtaining and interpreting data obtained from such a pressure sensing golf grip analysis by a computer implemented diagnostic tool.

There is a need for an improved golf club which provides this analysis within the club itself, and also a means for sending the data for processing and interpretation for the user.

There is a need for an analytical tool for indicating appropriate grip pressure, before and during a swing to assist golfers, and for assisting golf coaches in instructing golfers.

There is a need for a service which combines swing grip pressure data with other relevant data, including golf ball trajectory, golf ball location, hand speed, club speed, and other data to assist with near-real time swing analysis, learning and coaching.

There is a need for a meaningful way of providing the feedback information to the golfer, so that the club is gripped with the appropriate amount of pressure at the appropriate locations, throughout the swing.

In general, technical problems to be overcome include: chip design which permits the sensor wiring to connect to a large pressure sensor array and fit within the article being monitored; protecting the sensors without unduly compromising their performance; and providing useful user interface tools to interpret performance issues and/or trigger reliable alerts.

SUMMARY

The present disclosure is for a pressure and force mapping and orientation sensing system, designed for adaption to various types of objects to be monitored, where the location, force and timing of applied contact to the objects are of importance. Two general categories of objects for which the system is described are model packaging materials (boxes, bottles, cans, etc.) and sports equipment (golf clubs, racquets, sticks, clubs, bats, video game controllers, etc.).

The system comprises force sensitive-materials, which can be based from resistive, conductive, semi conductive, thin or thick film (hereafter referred to as the "sensing material"), with an electrode array designed and selected for a specified application, connected to a microcontroller for communication of the data to a software analysis and user interface tool.

The pressure sensor array is comprised of a layer of force sensitive material, an electrode array layer and an optional spacer element/layer. Depending on the application, spacers may be provided between rows and or columns of electrodes, to increase the distance between the force sensing material layer and the electrode array layer at initial state conditions. The spacers could also be adhesive to hold the force sensing material layer in place. Other sensors for the collection of orientation, acceleration, position, temperature, etc., of the object may also be provided.

The pressure sensor array connects to circuitry for the transmission of data from the array to a storage and/or processing element, which may be a microcontroller. Practically, the various orientation sensors may also be connected to the same microcontroller as the pressure sensor array, are may be adapted for the application. Whereas the pressure sensors are deployed on the exterior of the object being monitored, the microcontroller (with any additional sensors) may be inside or outside the object. Where the application calls for the microcontroller to be inside the object, design limitations of the size and shape of the object must be taken into account. In such an instance, tracings connecting the sensor array and the microcontroller must fit within openings of the object, ideally within the available opening which already exist in the object. In order to cover a curved surface, the sensor array may be adhered directly to the surface of the object in numerous places. The sensor array may be formed using a flexible printed circuit board (FPCB) or a collection or individual sensor strips. The microcontroller is provided with power supply, data storage and means for communicating the data to a separate device for further processing and output. The power supply may be a rechargeable battery. The means for communicating the data may be a wireless data interface (Wi-Fi™, Bluetooth™, mobile wireless infrastructure, or some other standard or non-standard wireless communications protocol) and/or a physical data interface (USB, USB 2, or some other standard or non-standard digital communications protocol).

The microcontroller may provide for some pre-processing of the data or may communicate raw data to a separate software analysis and user interface tool. The software analysis and user interface tool obtains the data communicated from the microcontroller and provides representation of the data for users. The data may be used to trigger alerts, interface with a game, or provide instruction to users to help improve performance.

Where the microcontroller uses a wireless connection, the software analysis tool may operate in real-time. The microcontroller may also be connected to onboard (i.e. on the object) output devices (audio, visual, haptic, etc.) to provide feedback or communicate other information to users.

The data received from the array of pressure sensors on the sensing material can be viewed as a stochastic set of matrices or vectors of impedance measurements with each element of the matrix/vector corresponding to the data from an individual sensor at a given point in time, and in which the complex impedance data is characterized by a function of force applied to the material. These characteristics are determined by the type of material and array chosen, and are known in the art. This data is communicated to one or more processors capable of interpreting for force data and translating it into a description of how the club is being held at any point in time. The location of the sensor electrode on the object determines position of the force registered at the applicable electrode. Where all sensors are individually registered, the mapping is straight forward. Where rows, columns and squares are used, a skilled user may refer to the disclosure in US 20110260994 "SYSTEMS AND METHODS FOR DETERMINING THE LOCATION AND PRESSURE OF A TOUCHLOAD APPLIED TO A TOUCHPAD" by Saynac et al, published Oct. 27, 2011, to map the sensor outputs to physical locations on the object.

Using a resistive touch technology, rather than a dielectric, as the material for the pressure sensor array enables a simpler and more durable product and requires only DC input voltage or current for operation, as the case may be.

Various materials may be used. For instance, a sensing material of the type disclosed in published international patent application WO 2010/122996 A1, FORCE SENSING COMPOSITIONS, DEVICES AND METHODS, by Luis Paulo Felipe Chibante, published 25 Nov. 2010, provides a flexible material from which to create the array of sensors within the golf club, which when connected to data collection circuitry, provide accurate and resilient pressure data. Various types of materials may be used: fabrics coated with various types of conductive materials; conductive foams, nanotube based polymers, carbon black based polymers, graphite doped plastics, etc, may be used as the pressure sensing material layer.

Data from the other sensors, if any, can be analysed to determine position, velocity, acceleration, or other characteristics of the object at any given time. In order to estimate orientation in real time using data from MEMS accelerometers and gyroscopes, open source AHRS (attitude, heading, reference system) algorithms are publically available to perform these calculations.

Using such an array, the resistive/conductive component of the measurement strongly outweighs the capacitive elements, and in a simplified design, the resistive/conductive component of the measurement may be used alone.

In another aspect, herein disclosed are various examples of a novel interface and device to capture, store and process the sensor data on an object itself, through processing hardware mounted inconspicuously on or within the object.

In another aspect, herein disclosed are various examples of a novel interface and device to capture and transmit the sensor data from the object to a remote processing application, through communications hardware mounted inconspicuously on or within the object.

BRIEF DESCRIPTION OF THE DRAWINGS

Certain embodiments will be described in relation to the drawings in which:

FIG. 4(a) is a cross sectional side view of one example of the pressure sensing material overlaid upon a FPCB sensor array of FIG. 3, showing grounding without spacers. FIG. 4(b) is a cross sectional side view of another example of the pressure sensing material overlaid upon a FPCB sensor array of FIG. 3, showing spacers.

FIG. 6 is diagram showing rows, columns and squares implemented on the sensor array using tracings connecting sets of sensor electrodes, with (a) showing a zoomed in portion of (b).

FIGS. 10 (a) and (b) are perspective views of an assembled container (box) (a) and unassembled container (box) (b) to which the packaging pressure sensor has been applied, showing a portion of the outer protective layer and a portion of the pressure sensing layer removed.

DETAILED DESCRIPTION

One or more preferred embodiments of the system will now be described in greater detail with reference to the accompanying drawings.

System Generally

Figure 1:
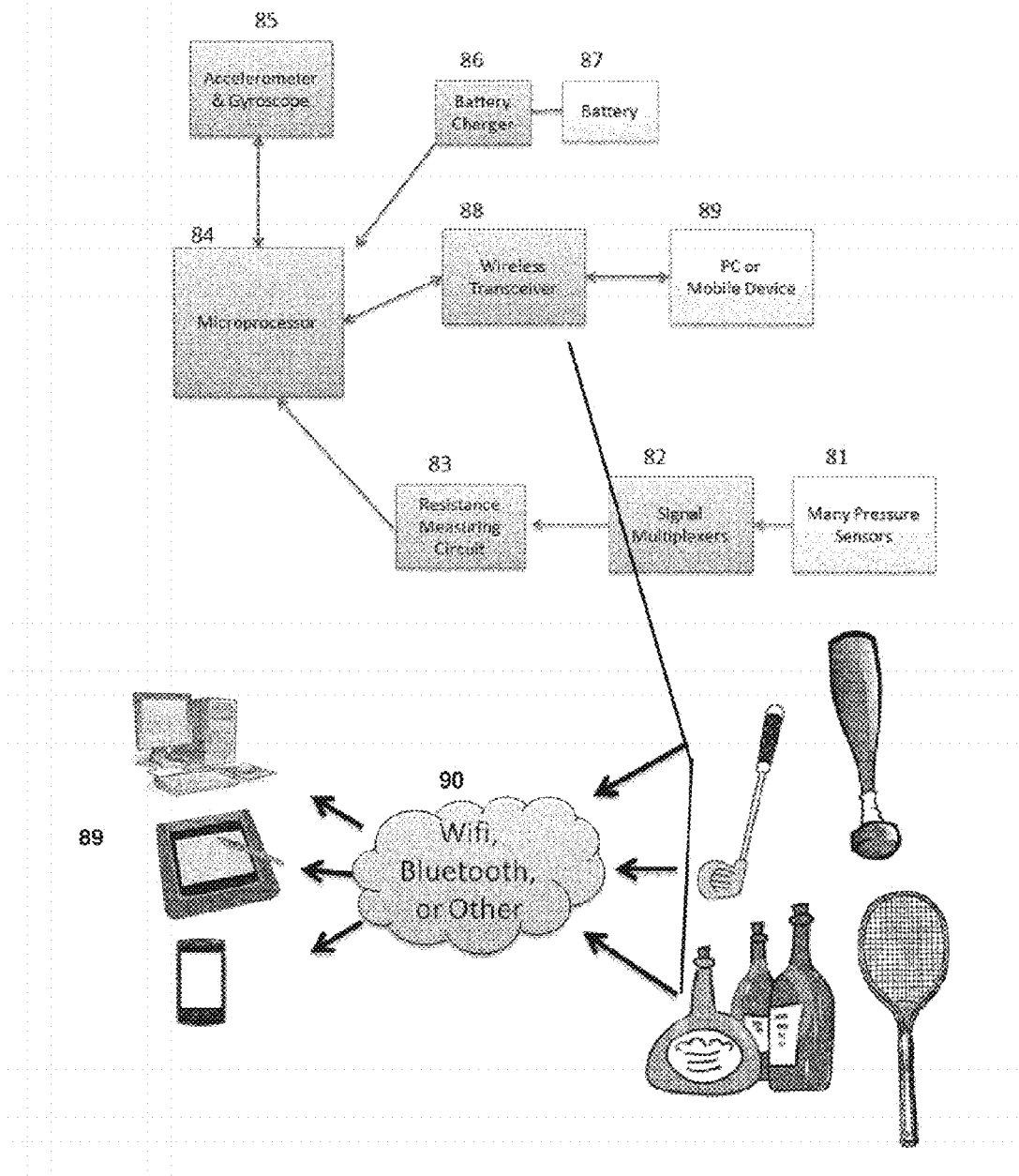
FIG. 1 is a flowchart showing interconnections of electronic components.

As shown in FIG. 1, the system comprises a pressure sensing array 81 connected to a microcontroller 84, through multiplexers 82 and resistors and amplifiers 83. Microcontroller 84 is connected to a power supply 87 through a charger 86, other orientation sensors 85, including a gyroscope and accelerometer, and to data transmission pathway 88, 89 90, which in the embodiment shown is a wireless connection 88 using a standard Bluetooth™ protocol, to the cloud of possible Internet based transmitters, routers, mobile telephone, etc. 90, to a remote processing and graphical user interface software on personal computing device 89, which may be operated on any appropriate device 89 (computer, tablet, smartphone, or other user operated device having a display).

Figure 2:
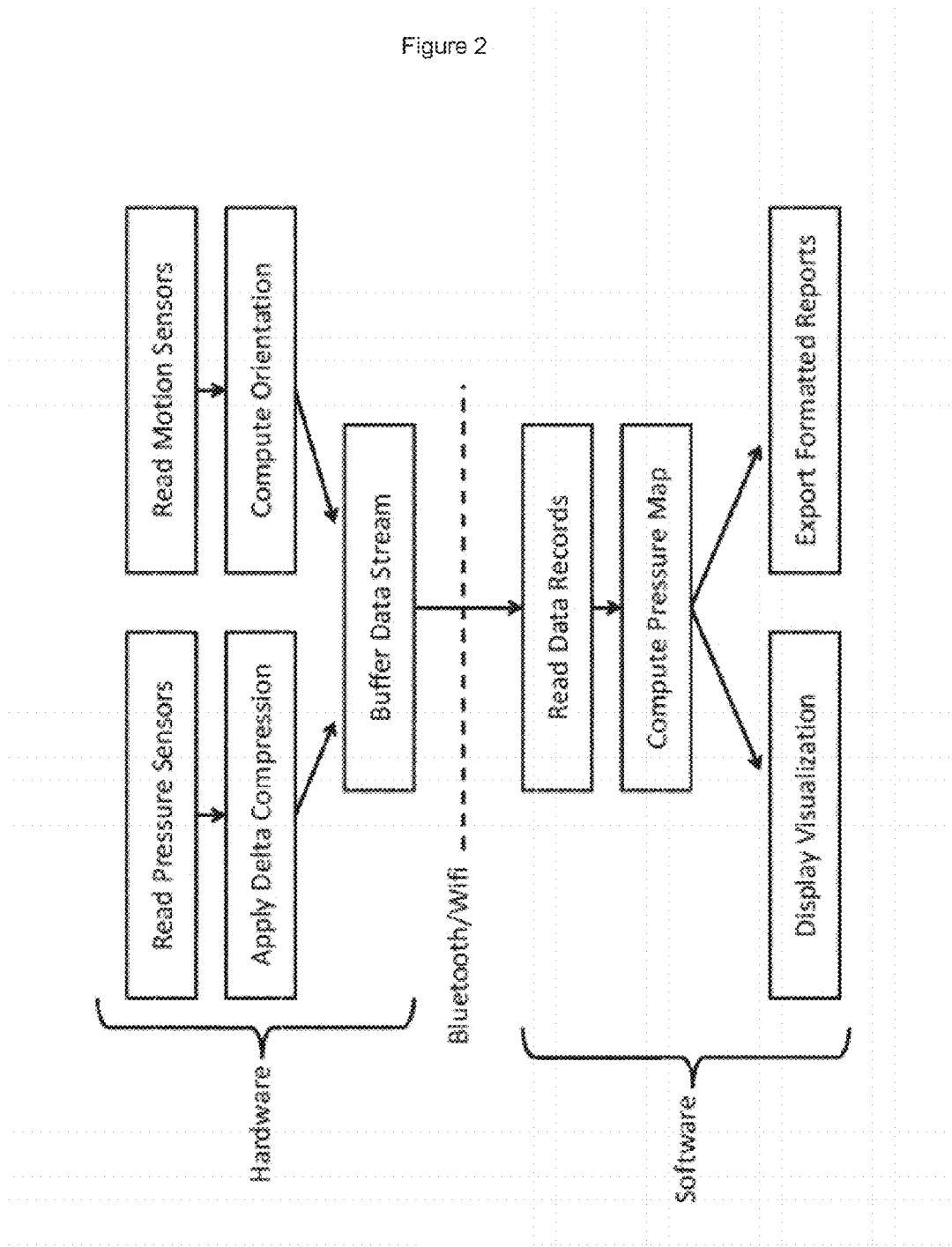
FIG. 2 is one possible processing flow chart for determining how sensor data is processed and transmitted within the system.

FIG. 2 provides a flowchart representation in which the resident hardware/software portions of the system are the object being observed, and comprise comprises the hardware to read and compress the sensor data, and possibly to perform some on chip computations based on the sensor readings before buffering the data for transmission to the non-resident software portion of the system.

Figure 3:
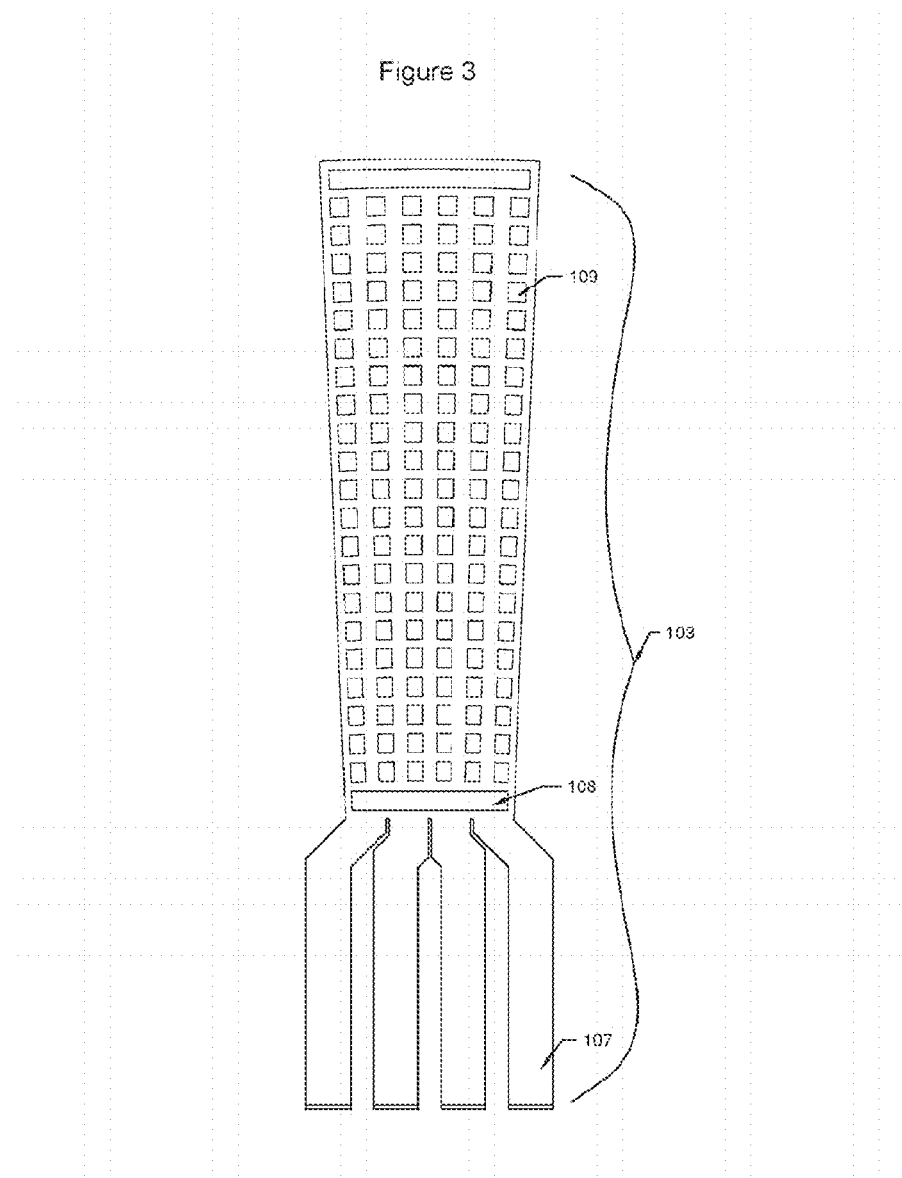
FIG. 3 is an embodiment of a sensor array for a conic section of an object to which the system may be applied.
Figure 5:
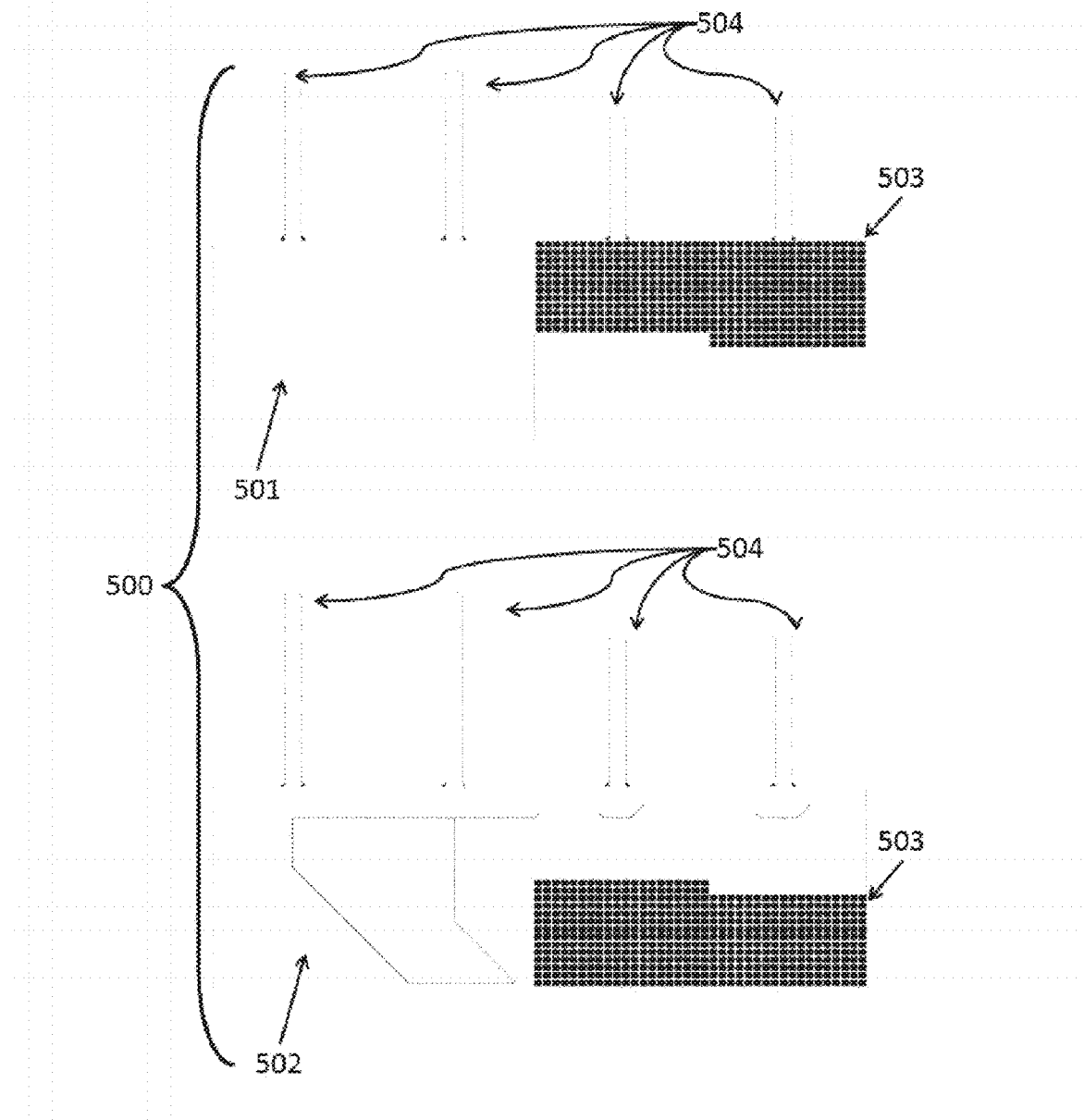
FIG. 5 shows top views of one embodiment of the FPCB Sensor layout of the system for use in a manufacturing line testing application.

Arrays of sensor materials of particular shapes and configurations are selected for use in particular applications (see FIG. 3, FIG. 5, FIG. 6). As an example, FIG. 3 shows an array which may be applied to conical surface. The sensor array layer 103 as shown in FIG. 3 is laid out flat, and is comprised of 126 sensor elements (electrode pad) 109 available to obtain pressure data for the system. Other embodiments, including where a multiplexor is used, can define sensor arrays with more or less elements, as desired. Similarly, the geometry of the array shown is simplified and there is no requirement that the sensors be in rows or columns. The control circuitry and computer processors are instructed to identify the locations of the various sensor elements as part of the design. In this instance, each electrode pad 109 acts as an individual pressure sensor which feeds into the control board via the electronics 107. In order to facilitate computations and resistance measurements, a common electrode may be chosen (local ground), and in such an option, two large electrode strips 108, one at either end of the array which may act as the electrical "grounding"/a common electrode for the circuits.

Two optional cross sectional views of the pressure sensing array layer of FIG. 3 are shown in FIG. 4. This pressure sensing array layer is comprised of two primary components: a flexible array of electrodes 109 and a pressure sensitive piezo-resistive material 104. In FIG. 4 (a), the piezo-resistive material 104 is connected to grounding strips 108 by connector 111 (formed from conductive adhesives such as silver epoxy, sputter gold, etc.). The mechanism of pressure detection using the material is disclosed in WO 2010/122996 A1, FORCE SENSING COMPOSITIONS, DEVICES AND METHODS, by Luis Paulo Felipe Chibante, published 25 Nov. 2010, except that instead of the pressure sensitive piezo-resistive material and the circuit board laying on a flat planar surface, the assembly may be wrapped around the surface of the object being observed in more novel arrangements using a FPCB. The piezo-resistive material can be chosen from the set of piezo-resistive materials consisting of: nanotube based polymers, carbon black based polymers, polymers doped with conductive particles or fibres, fabrics coated in conductive materials, conductive foams, etc. In FIG. 4 (b), spacers 180 have been added to bias the piezo-resistive material 104 away from the electrodes 109, and also to optionally act as contact adhesion or grounding points for the piezo-resistive material 104.

As the force sensing material may use a common ground terminal, in the example enlarged in FIG. 4(a), a ground terminal 108 is connected to ground and a sensor terminal 109 is connected to the control board (not shown) to obtain dynamic resistance (impedance) measurements. The ground terminal is created by conductive adhering connectors 111 of the outer side of the piezo-resistive material 104 to match up with the ground strips 108 on the FPCB board 103. Then once the piezo-resistive material has been wrapped around the handle, a pressure connection is permanently formed by pressing the gold sputtered region 111 to the electrode ground strips 108, thereby grounding the outside of the piezo-resistive material layer in the appropriate sensor areas. Other connections are possible, as known in the art. Elsewhere, at sensor terminals 109, a high resistance connection is generally formed (not necessarily with an air gap), and the resistance between the ground terminals 108 and the sensor terminal 109 is reduced as grip pressure is increased (in accordance with the physical properties of the sensor material 104).

The layout of sensors can also be comprised of, but are not limited to, individual pads, rows and columns, or rows, columns and squares, of a typical touch screen display but implemented on the surface of the object being observed. In each case, the data from the sensors will be captured by the control board to a complete 2D pressure map for the surface covered by the sensor array at instances in time. The graphical user interface software may display the data in relation to the three dimensional object whose surface contact is under observation. FIG. 5 shows another layout in which 256 individual sensors 503 are printed on a FPCB 500 (shown 2 parts), in which each grouping of 32 electrode pads forms a lead 504 (which is provide with a 33 pin port, for the 32 pads and ground). An area 502 of the FPCB 500 provides room to manage tracings which form the leads/connections 504. In FIG. 6, the sensor electrode array 600 has spacers 601, rows 602, columns 603 and squares 604, with electrodes being defined to the same row 602, column 603 or square 604 by the traces 20 connecting them. The top row in the version shown is a common ground terminal 605. Regions 606 are available for other spacers 601 (not shown so the traces would be visible).

While the object shapes may be of differing size, for which different sensor arrays and covering layers may be used, it is desirable to operate a common platform of internal control electronics a complete electronic solution for the pressure mapping and orientation sensing system. In this manner, common electronics (other than the electrode array) can be used within many different objects. The control board interfaces with a number of customized FPCB sensor array through a standard connector, and provides on-board processing and either wired or wireless transmission of the pressure data.

Figure 7:
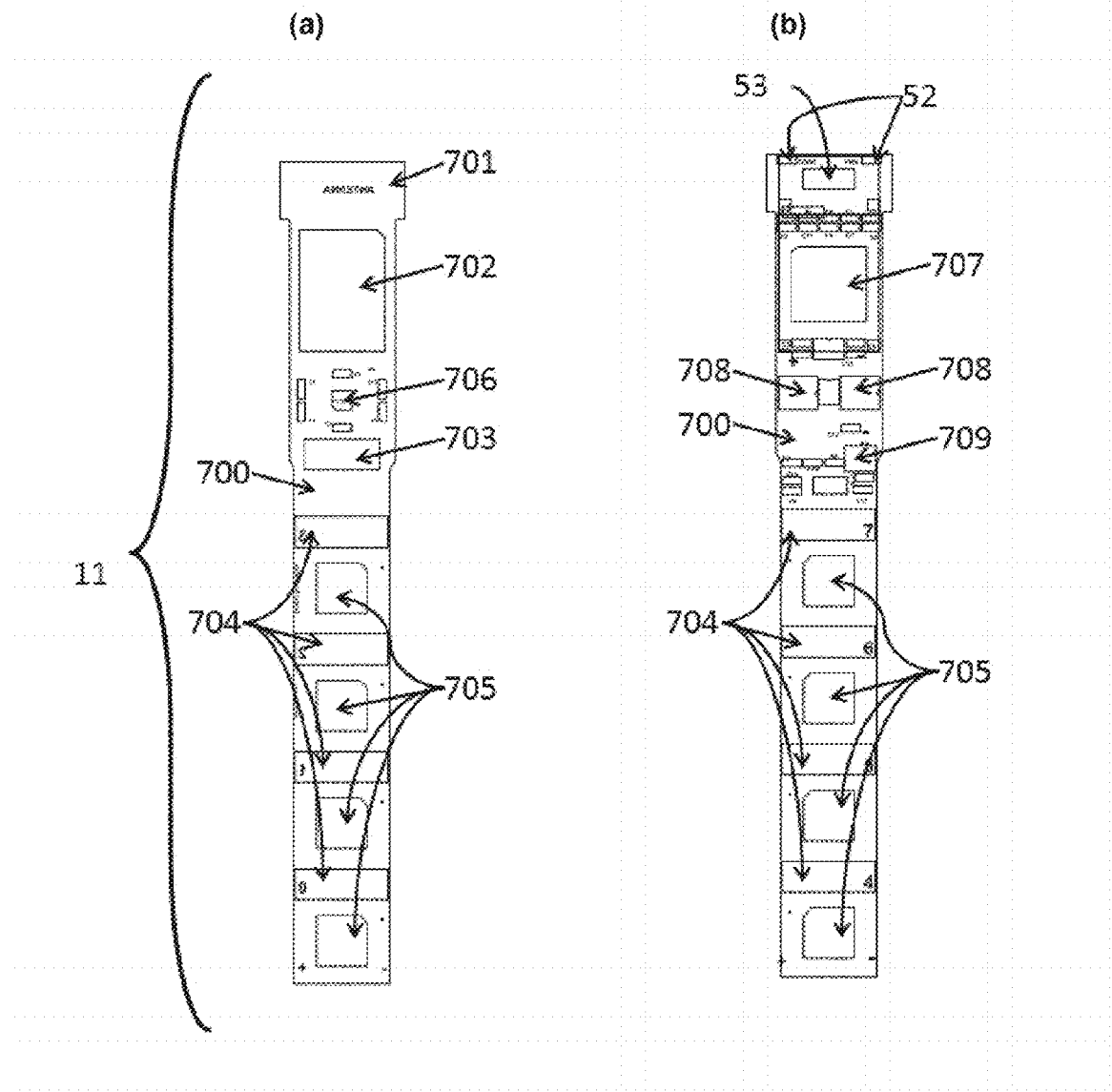
FIGS. 7 (a) and (b) are top and bottom views of a control board implementing the system.

In the example shown in FIGS. 7 (a) and (b), the board 700 incorporates a 6-degree inertial measurement unit for full 3D spatial positioning and orientation, and may be connected to other internal or external sensors to measure other environmental parameters. The user interface for software used to graphically display the orientation of the sensor object can, in principle, be used for any shape of object being modelled by the pressure sensor array.

The hardware may consist of:
Rigid PCB small enough to fit inside a golf club shaft, (11)
32MX764F128H 32-bit microprocessor at 20-80 mhz, (707)
256 multiplexed pressure sensor inputs, (704)
Hirose FH39 33-pin connectors and ADG732 muxes, (705)
12 bit ADC with high sampling rate,
8 resistor array and two op-amps for pressure input circuitry, (708)
MPU6050 (3-axis gyroscope, 3-axis accelerometer), (706)
RN-41 Bluetooth wireless module, (702) and antenna (701)
3.3V regulator allowing battery power up to 6V,
3.7V LiPo battery charger (709)
The software may consist of:
Firmware to read pressure sensors, motion data, and perform on-board processing within 1 ms per cycle,
Firmware to perform complex 3D motion calculations on-board,
"Processing" PC and mobile device code for interfacing with the device, customized for each application This example system FIG. 1 and FIG. 7 provides pressure-sensing capability for a wide array of unknown articles to be modeled by users. In the devices shown, an on-chip ADC is connected to 8 32×1 multiplexers providing 256 sensor inputs over 33 pin Hirose connectors; and an 8-resistor array is selected as a pull-up resistor for each ADC input.

This example system of FIG. 1 and FIG. 7 is small in size, in order to fit into a wide array of possible objects for observation. As shown in FIG. 7, the board is 0.55" wide in order to fit inside the container. If less than 8 connectors are needed the board can be cut to length from 5" (all sensors) to approx. 2.5" (motion only). This board fits inside any cylindrical housing with a sensor board wrapped on the outside such that the cables flex into the connectors from the top.

The example system of FIG. 1 and FIG. 7 uses a low amount of power. At full capacity it is designed to require approx. 100 mA of power, which can last 10 hours per 1000 mAh battery. Multiple batteries can be placed in parallel as the application permits. Optionally, the board may include a charging circuit for micro-USB charging at up to 500 mA (1 hour partial, 4 hour full charge).

The example system of FIG. 1 and FIG. 7 operates at a high sampling rate, and provide responsive output. In the devices shown, the microprocessors operate at 20-80 MHz (80 MHz default, 20 MHz reduces power to 50 mA total). Optionally, the pressure sensor data is delta-compressed, and 20 KB of on-chip memory serves as a buffer for variable rate transmission. On board firmware can be configured to send data at a faster rate, and use the buffer if necessary to send high resolution data, when triggered by external events such as high periods of motion or impact.

The example system of FIG. 1 and FIG. 7 provides an accurate measurement of spatial positioning and orientation within tolerances of the sensors. In the devices shown, an optional 3-axis accelerometer provides acceleration up to +/−16 g at a resolution of 4 mg (configurable), and an optional 3-axis gyroscope provides angular velocity up to 2000 deg/s at a resolution of 70 mdps. In the flow diagram of FIG. 1, these sensors (MPU6050) 706 are read by the microprocessor 707 which updates a spatial positioning and orientation frame at 512 Hz. DMA is used to permit asynchronous computation and data transfer so a single processor is sufficient.

The example system of FIG. 1 and FIG. 7 communicates with a software interface usable (or configurable for use) in a number of applications. The devices shown can support configuration through a number of commands, and provide data to a host CPU when requested. Such commands include: enabling/disabling pressure and motion sensors; enabling/disabling various levels of pre-processing of data; selecting/adjusting the data rate; calibrating the sensors; etc.

Manufacturing and Shipping Related Applications

FIG. 8 through FIG. 12 shows how the system described herein may be applied as a packaging sensor system designed to be carried through a manufacturing line (described in FIG. 12), as a proxy for actual articles in the manufacturing chain which are the same shape as the packaging sensor. Examples of a can (FIG. 8), bottle (FIG. 9) and box (FIG. 10) are shown, and the process can be generalized to regularly shaped objects, the surfaces of which can be wrapped by the FPCB pressure sensor array. The packaging sensor detects any pressure on the pressure sensing layer, as it travels in a manufacturing line, as described in FIG. 12, and registers any forces to which the container is subject within the tolerances of the sensors. In the examples shown, the packaging sensor is comprised of a control board stored within a cavity defined by a support layer/housing, about which a flexible sensor array of appropriate size and shape for the application is wrapped or placed.

Figure 8:
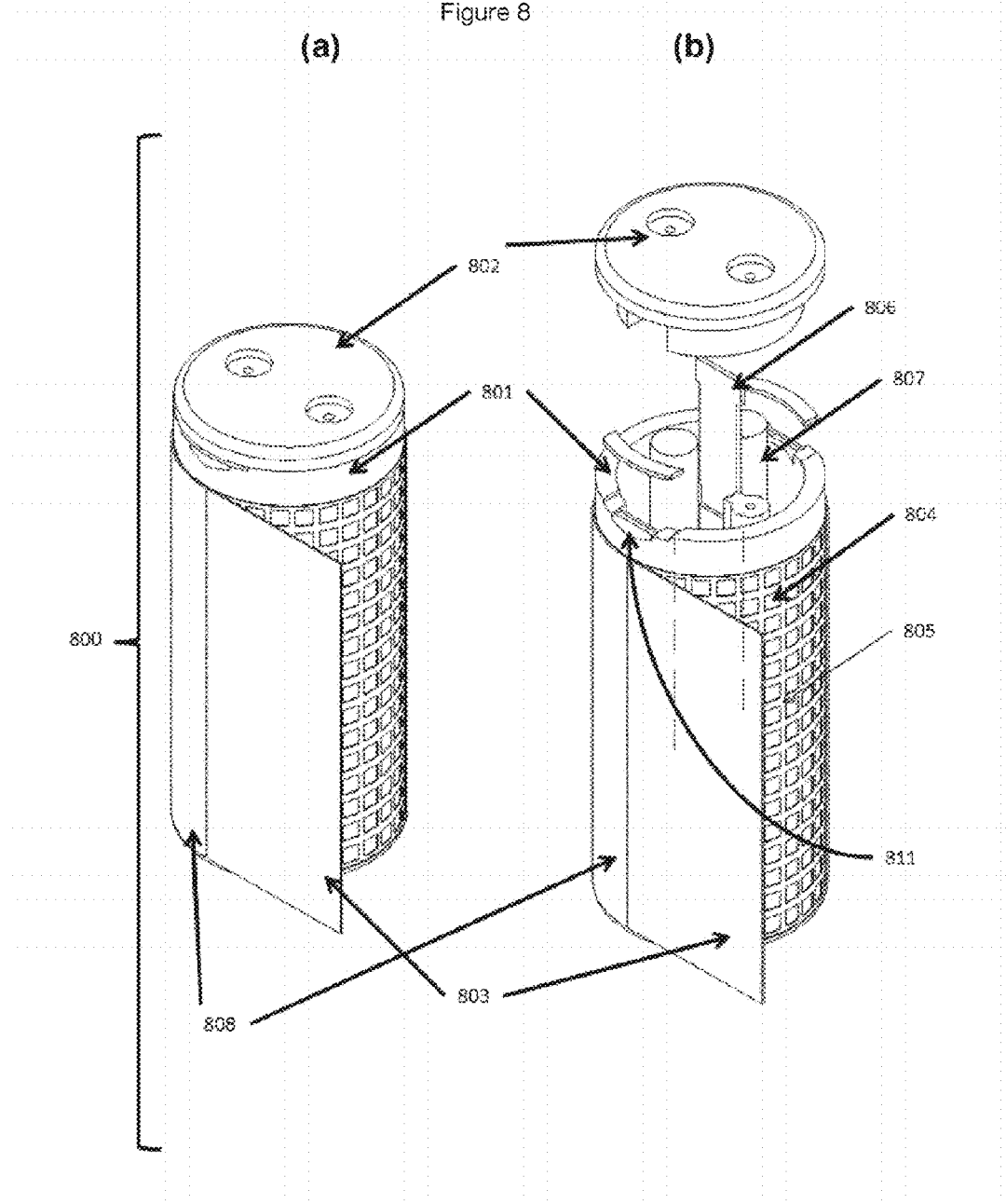
FIGS. 8 (a) and (b) are a perspective views of an assembled container (can) (a) and disassembled container (can) (b) to which the packaging pressure sensor has been applied, showing the outer protective layer and pressure sensing layer peeled away.

For example, in FIGS. 8 (a) and (b), a can shaped sensor 800 is form primarily from a housing/support layer 801 and a cap 802. Disposed about the support layer 801 is the FPCB based pressure sensor layer of which the electrode pads 804 and optional spacers 805 are visible. A layer of piezo-resistive material 803 covers the spacers 805 which bias it away from the electrode pads 804. An optional protective layer 808 covers the pressure sensor layer. The control board 806 is disposed within a cavity of the support layer 801, as is the battery power supply 807. An opening 811 between the support layer 801 and the cap 802 allows leads from the electrodes 804 to connect to the control board 806. The sensor arrays may be in either of the connection schemes shown in FIG. 5 or FIG. 6, or some other scheme within the art. The control board 806 may be of the form shown in FIG. 7. The entire device should model or mimic (in relevant dimensions) the can normally featured within the manufacturing line for which diagnostic information is sought. The bottle 900 of FIG. 9 and the box of FIG. 10 are constructed in a similar fashion with analogous parts.

Figure 9:
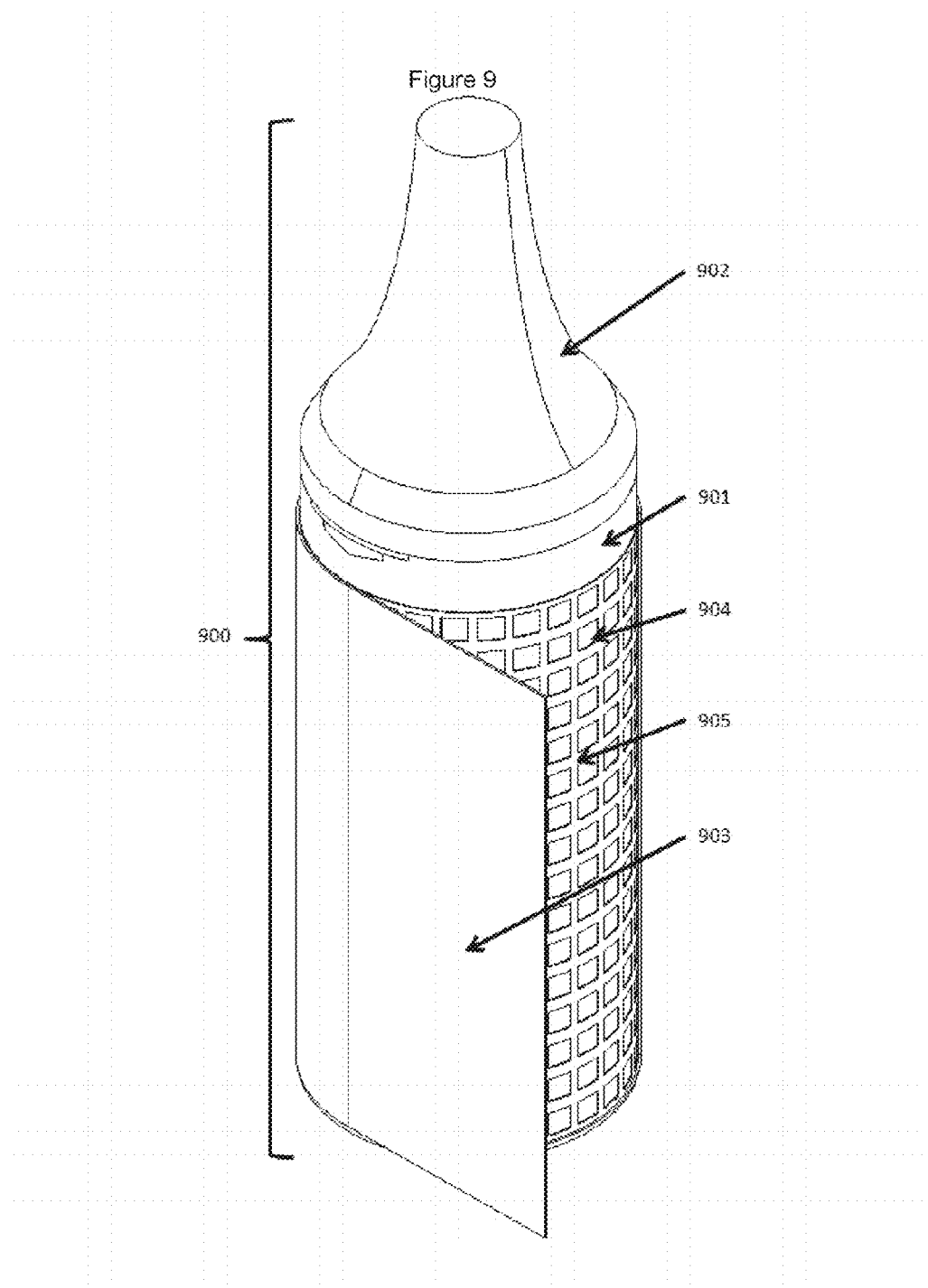
FIG. 9 is a perspective view of an assembled container (bottle) to which the packaging pressure sensor has been applied, showing the outer protective layer and pressure sensing layer peeled away.

In FIG. 9 the bottle shaped sensor 900 (the hardware portion of the system) has a support layer 901, a cap layer 902, electrodes 904 and spacers 905, covered by a piezo-resistive material layer. In FIG. 10(a) the boxed shape sensor 1000 (the hardware portion of the system) has six sides covered with sensor arrays 1020 or electrodes, optional spacers and piezo-resistive material layer, covered by an optional protective layer 1010. In the disassembled view in FIG. 10(b), control electronics/control board 1030, the battery 1040 and the support layer 1050 are also visible.

Pressure and other parameters measured by sensors are detected and may be stored for later download, or send in real-time via wireless communication (including Bluetooth™ or WIFI™) to a PC or mobile device for storage and/or analysis. In the example shown, orientation and acceleration of the object are measured using sensors connected to the board of FIG. 7, and the resulting data is sent wirelessly to user interface software application which interprets the data.

The packaging sensor implements sensor and reporting technology to assist manufacturers (including packaging companies) in identification of root cause failure as a result of high levels of side-wall pressure and accumulation pressure in the packaging lines.

Packaging/bottling is an important part of the food/beverage industry. Overall, the entire industry has had little advancement in monitoring accumulation pressures. Both packaging companies and suppliers alike have identified side-wall pressure monitoring as an important measurement in the factory line. The use of the technology disclosed herein is aimed to address this issue with real time wireless pressure, force and/or orientation measurement.

This invention can applied to current packaging lines to improve:
1) Line set up and changeover times;
2) Line stops as a result of container or package failure;
3) Lubrication;
4) Scuffing and label integrity; and
5) Denting and cap seal failure (food safety).

The hardware and software used in these examples may be the same as disclosed for the general system above.

In one example, the packaging sensor is applied to a container for the purposes of determining location and magnitude of any pressure sufficient to dent or damage the container at particular locations. In the example of the can shaped sensor of FIG. 8, the full sensor array features 256 individual point sensors (shown in FIG. 5). A row/column/square layout of the array may also be used in this example. The sensing area shown here is approx. 8"×5", comprising 19×13 individual sensors grouped in 2×2 rectangular copper electrode pads. FIG. 9 shows a bottle shaped sensor. FIG. 10 shows a box shaped sensor. In each case, the support layer/housing creates a container within to protect the electronics, and is sized appropriately to become the same size as the items in the applicable manufacturing line once the array, pressure sensitive layer and protective layer are applied.

The examples use the control board of FIG. 7, which is approx. 5"×0.5" in size, and has 8 32 pin sensor connectors with a ground terminal. It fits within a standard 355 ml aluminum can, and can be used for measuring impact pressure on aluminum cans or glass bottles various shapes by changing the array within the design parameters.

Figure 11:
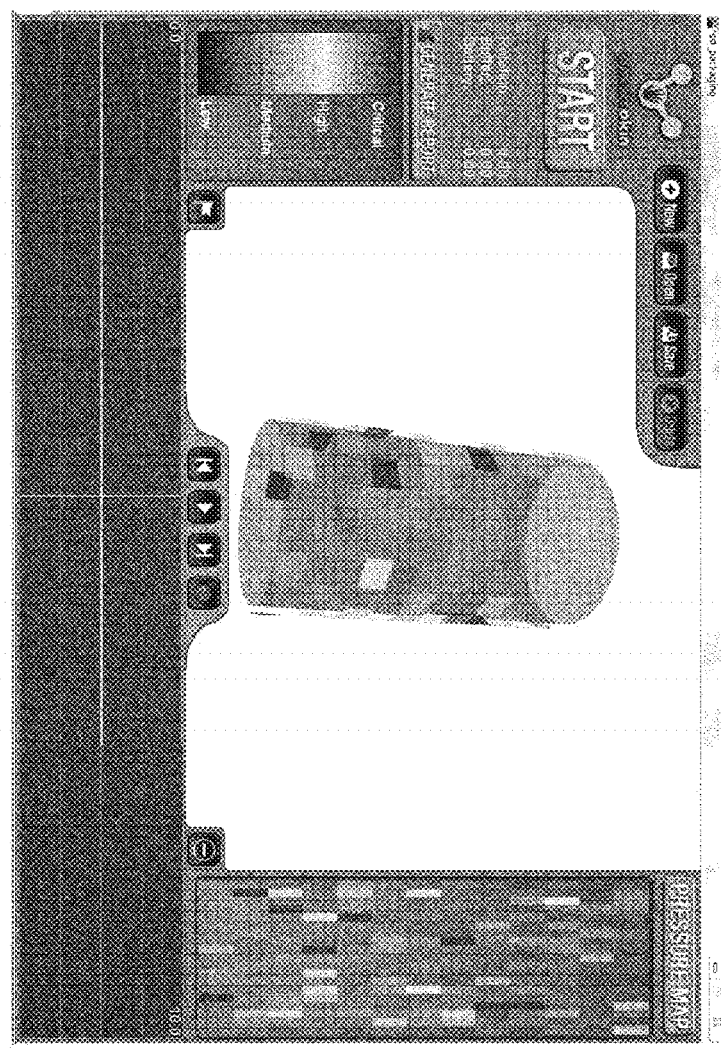
FIG. 11 is a screen shot of display software showing pressure data on different portions of the can shaped packaging pressure sensor of FIG. 8.

FIG. 11 shows a screen shot of the software monitoring application configured for use with the can shaped packaging sensor of FIG. 8 or the bottle shaped packaging sensor of FIG. 9. Pressuring mapping on the surface of the pressure sensing array and orientation of the packaging sensor as determined by the orientation sensors on control board, are communicated to the software application, where a video clip in the middle of the screen shows a 3D representation of the orientation of the pressure sensing array and the corresponding forces in either colour or greyscale on the surface positions corresponding to the actual array positions.

Figure 12:
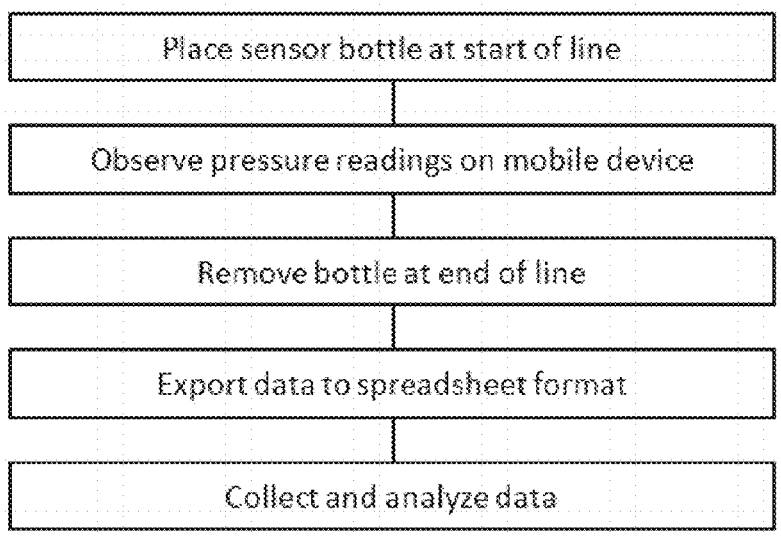
FIG. 12 is a flow chart of user experience using the bottle shaped sensor of FIG. 9 to monitor impacts on a manufacturing line.
Figure 13:
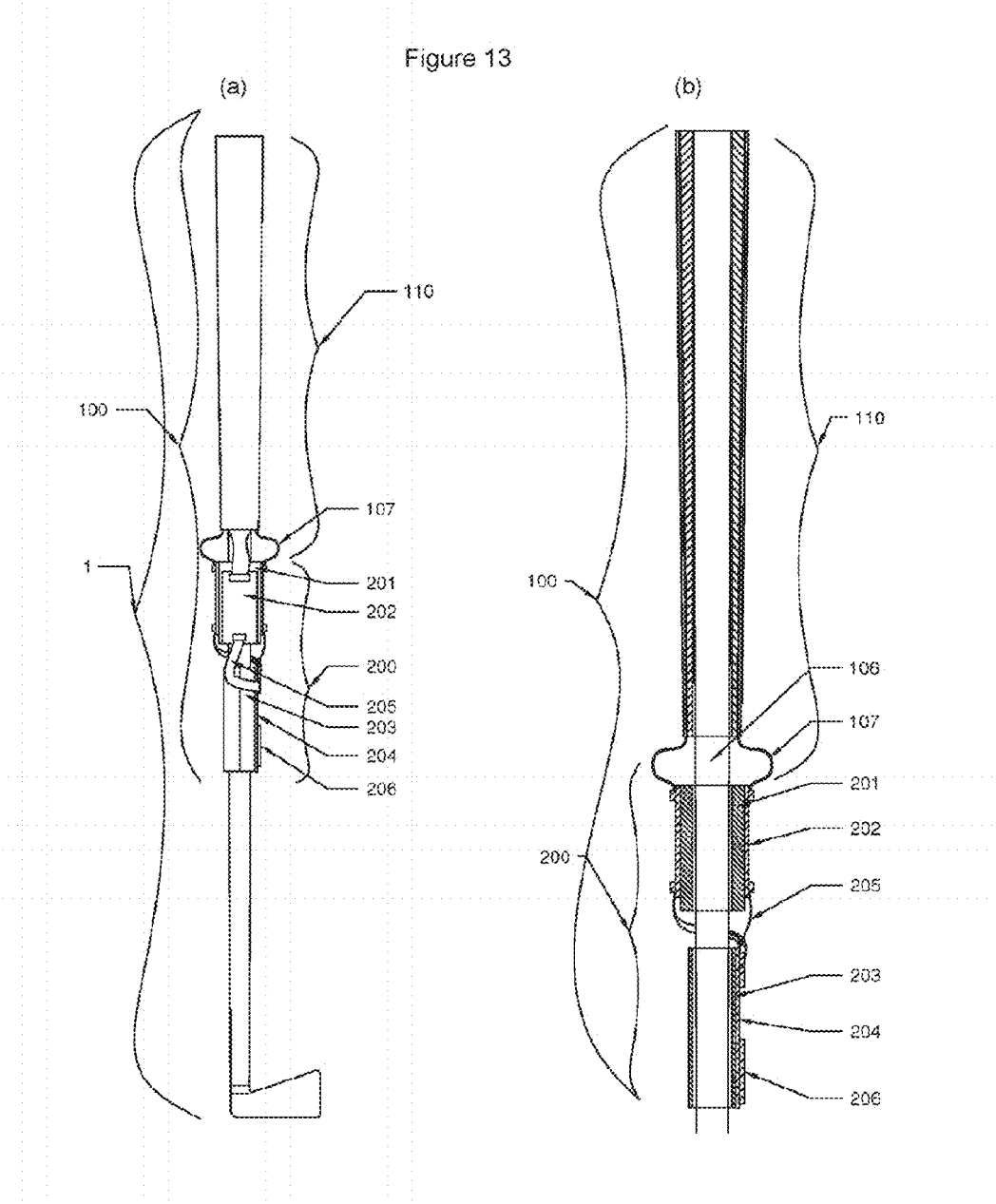
FIG. 13(a) is a top side view of a golf club fitted with an example of the sensor system as a force sensing grip with control electronics outside the club.
FIG. 13(b) is a cross section side view of the portion of the golf club of FIG. 13(a) where the sensor hardware portion of the system is positioned.

A user of the manufacturing line monitoring system proposed would follow the simple instruction flowchart in FIG. 12. With the packaging sensor already connected wirelessly to monitoring software on a mobile device, the user would: 1. Place the sensor at the start of the portion of the line under review; 2. Observe real-time pressure and orientation readings on the mobile device; 3. Remove the sensor at the end of the portion of the line under review; 4. Export data to spreadsheet format; and 5. Perform additional data analysis.

Golf Related Embodiments

The first example of a golf club grip to which the system disclosed herein has been applied with external control electronics, is described in FIG. 13 through FIG. 17. In this example of a force sensing golf grip, the sensor array of FIG. 3 has been used.

Figure 14:
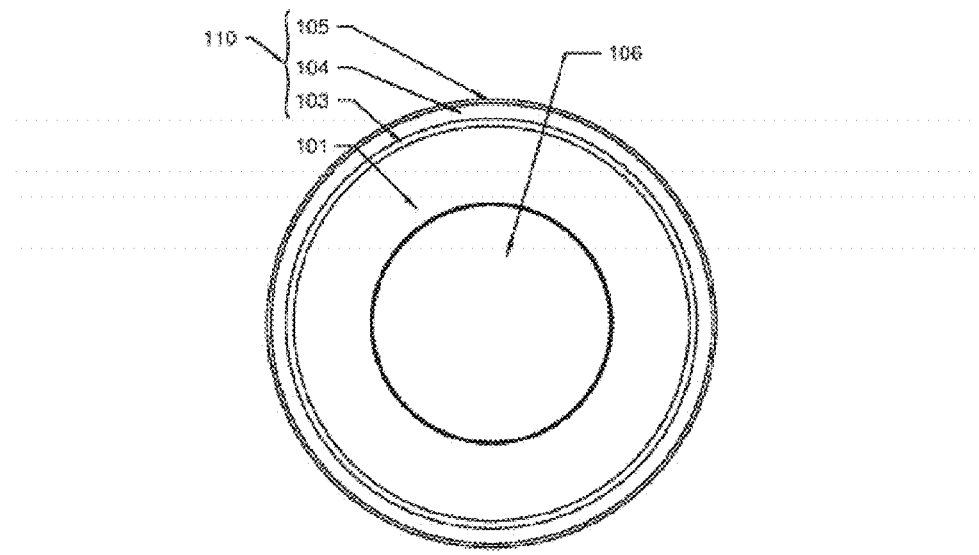
FIG. 14 is a cross section view the handle portion of the golf club of FIG. 13(a) perpendicular to the shaft in the region where the sensor array is positioned showing the layers of the force sensing grip.
Figure 15:
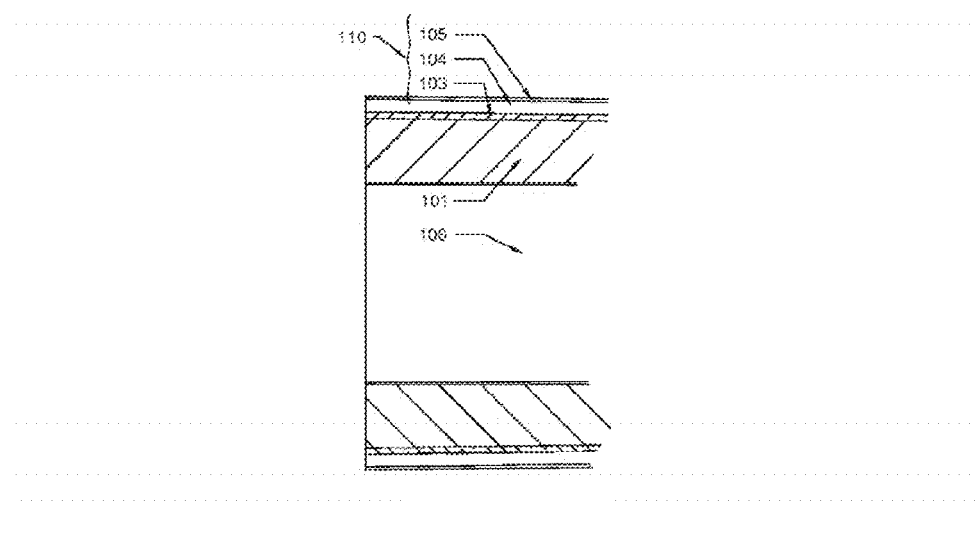
FIG. 15 is a cross section view the handle portion of the golf club of FIG. 13(a) along the shaft in the region where the sensor array is positioned.

As shown in FIGS. 13(a) and (b), a golf club 1 is either fitted with or already provided with a golf grip assembly 100 comprised of a layered grip assembly 110 and a control board assembly 200 connected thereto below the grip external to the club. As shown in FIG. 14 and FIG. 15, the layered grip 110 further comprises: a handle/inner layer 101 which connects to the golf club 1 at that club shaft 106; a sensor layer fabricated in the embodiment shown from an electrode layout flexible printed circuit board 103 upon which piezo-resistive sensor material 104 has been connected for radial force/pressure sensing; and an outer protective layer 105 to be actually gripped by the golfer. Alternatively, there may be an existing handle on the golf club, which would act as substrate for the layered grip assembly 110 with some form of inner layer for detachable attachment to the existing club handle, or be avoided/removed altogether such that the sensor array layer 103 and sensor material layer 104 be attached directly to a custom built handle 101. Sensor leads 107 connect the golf grip assembly 110 to a control board assembly 200.

FIG. 13(b) also shows the control board assembly 200 for control of the layered grip assembly 110. It is comprised of the multiplexor housing 201 covering the multiplexor boards 202, a control board housing 203, covering control boards 204, and mux-control cables 205 to permit communication between the array and the control board assembly 200. The control board 204, preferably houses a wireless module 206, which may include but not limited to Bluetooth™, Wi-Fi™, etc., to send data to a smartphone and/or computer for further processing. In this case, the data is transmitted wirelessly from a transceiver 206 on the control board 204, to a separate software application for further data processing and user display and interface (see FIG. 17). However, data storage and a physical data connection to an external processing and user interface application may also be employed.

Where the array of FIG. 3 has been used, the control board assembly 200 connects to sensor leads 107 of the flexible printed circuit board 103 at a multiplexor board 202 within a multiplexor housing 201. This multiplexor board 202 multiplexes the plurality of signals from the sensor array layer 103/104 and communicates them over mux-control cables 205 to the control board 204 within the control board housing 203.

In the version shown in FIG. 5, the bare pressure sensing array layer is comprised of two primary components: a flexible array of electrodes and pressure sensitive piezo-resistive material. As disclosed herein, other piezo-resistive materials can be used without departing from the scope of this disclosure. The golf grip may also be implemented using non-rectangular pads and having the electrode pads printed directly onto the handle without the use of FPCBs (or viewed alternatively, FPCBs in the shape of a handle).

The electronics and electrical circuits for the pressure sensing are configured from existing solutions in touch screen technology, but implemented over a curved surface with knowledge of array element locations in relation to the surface of the object being observed.

In a first example of the golf grip application, a software module compatible with receiving and processing grip data obtained from the golf grip assembly, allows the real time recording of all the sensors' values at sample rates set by the software, on enabled mobile computing device, tablet, smartphone or computer. However, the software can be ported to any computing device or operating system, or be configured in firmware to operate on the control board itself, including without limitation, smart phones, personal computers, laptops, tablets, provided that they are ultimately provided with a data connection to the control board on the object being observed (in this case the golf club grip).

As presenting raw data has only so much use to the user, further processing is necessary to permit users and coaches to address problems with grip as it affects a players' swing. A goal of the software module is to process the golf grip data in such a way that is most useful to the user. In one aspect, regions of the array are defined representing upper and lower hands, fingers, thumbs, pads of hands, etc. At its simplest, grip pressure in each hand may be assessed, for example, by dividing the region in which pressure is detecting into an upper and lower region, and then by averaging the upper region of the sensor values into one signal and averaging the lower region of the sensors into another signal, as shown in the flow chart of FIG. 16.

Figure 16:
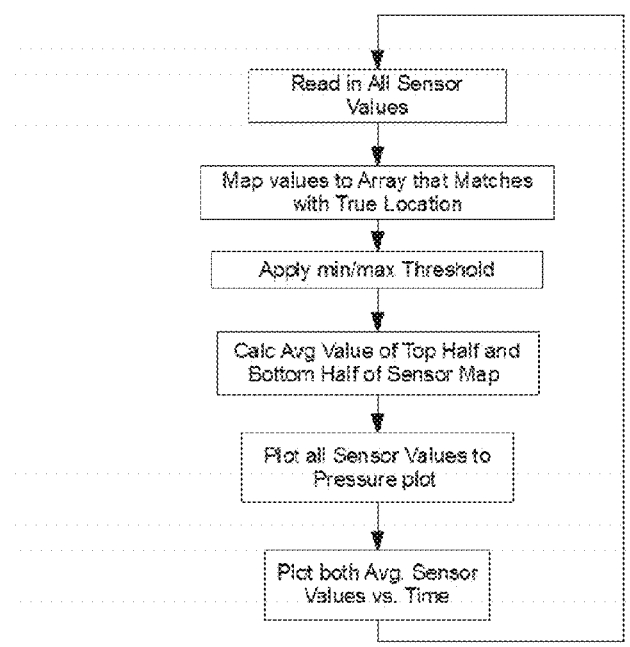
FIG. 16 is a flow chart showing one possible method by which one diagnostic measure of the golf swing (strength balance between hands) is obtained and plotted by a software tool implementing part of the present invention.

Step 1 of FIG. 16 is reading in all sensor values from the sensor array.

Step 2 of FIG. 16 proposes mapping values from the array to a matrix which the processing system recognizes as matching to true locations of each sensor on the golf club handle.

Step 3 of FIG. 16 is creating a leveled histogram through min/max thresholding on the data to obtain digital ranges for further processing of the software with useful resolution. Various voltage mappings can be used to achieve this and the control board software programmed or reprogrammed to permit appropriate quantization for a given application. Steps 3 to 4 of FIG. 16 generally occur on the control board (e.g. part 204 of FIG. 13(a)).

Further processing may occur on or off the control board, so an intervening step may be to transmit the quantized data over the wireless network for further processing by an application layer device, like a smartphone.

Steps 4 through 6 of FIG. 16 show a simplified example of an application using the data from Step 3 of FIG. 16. Step 4 of FIG. 16 calculates pressure data on the top half and bottom half of the grip at a point in time. Step 5 of FIG. 16 plots all sensor values to a pressure plot of the same shape as the laid out sensor array. Step 6 of FIG. 16 plots the top half and the bottom half averaged pressure data over time. The data may be logged for further processing.

Figure 17:
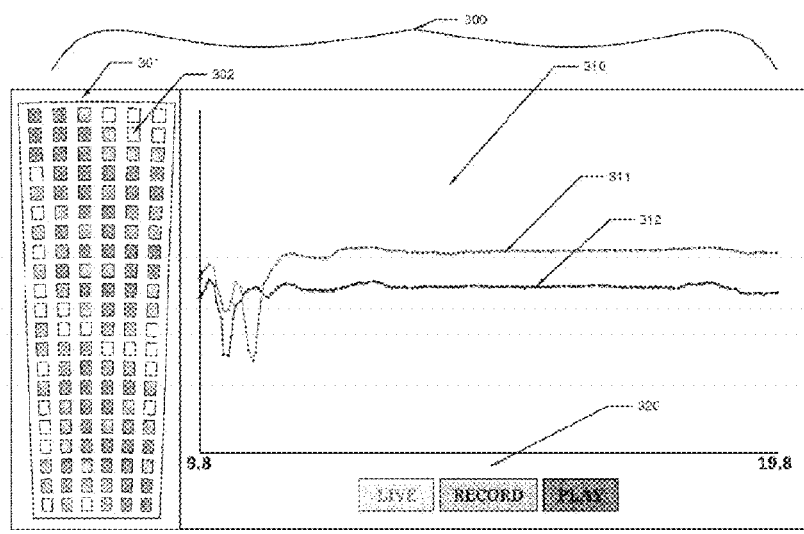
FIG. 17 is a screen shot of one graphical user interface of the system shown in FIG. 13, showing the pressure sensor outputs in grey scale on the left (the array used is the one shown in FIG. 3) and the relative hand pressure according to the method of FIG. 16 on the right.

A user interface display screen shot 300 is shown in FIG. 17, where the two signals of hand grip pressure are plotted on a pressure versus time strip chart on the right side of the screen and point in time sensor values are plotted on the left. A plot of sensor values in grey scale 301 shows less pressure as white and more pressure as darkening grey levels at each point on the golf grip laid out as a typical quantized sensor results 302 (as outputs from Step 3 of FIG. 16). Direct feedback on individual hands can be provided, as well as more individualized feedback for particular sensors as compared to a database of preferred golf grips. Data is presented as an array representing the real layout of the sensors on the grip handle at a point in time. On the right, a graph plots averaged pressure values 310 of the top pressures 311 and bottom pressures 312 obtained from Step 4 of FIG. 16. The screen shot 300 of the graphical user interface also shows control buttons 320. Although the version shown is grey scale, a color display is preferable.

Feedback from the system of the present golf diagnostic tool may be provided at the controlling external device or by return transmission to the golf club transceiver and the activation of some on club audio, visual or haptic output. If the controlling external device is a smart phone, the phone can activate audio or haptic (i.e. vibration) to alert the golfer that something is wrong or needs to be changed. It is desirable to maintain low additions to the mass of the golf club (in particular the handle), and as such, it may be simpler and lighter to have golfer feedback from a source other than the golf grip. In furtherance of this goal, the materials used to create the hardware portion of the system may be designed with materials to have the same overall weight as the standard golf grip being replaced by the hardware system components and protective layers.

In the example of in FIG. 13 through FIG. 17, the FPCB has been adhered to a standard golf club handle layer using known adhesives. The piezo-resistive material is held on currently by pressure from the outer layer, alone, and from pressure as may come from a simple tight tape wrapping around the gold sputtered regions on the material that is aligned with ground strip on the FPCB. As a design consideration, different peizo-resistive materials will have different minimum and maximum pressure sensing thresholds, and the grip pressure about the force sensing layer cannot exceed the maximum threshold, and is ideally near the minimum threshold.

Certain limitations of functionality of the first example of the golf club grip shown in described in FIG. 13 through FIG. 17 are addressed in the second example of the golf club grip with internal control electronics, pressure and force mapping and orientation sensing.

Figure 18:
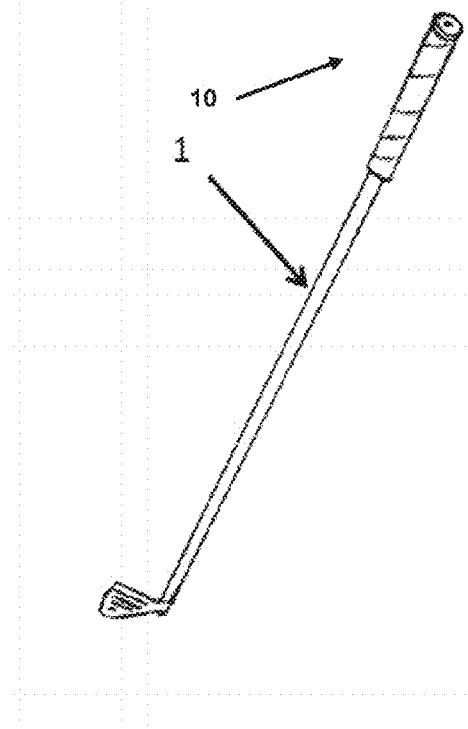
FIG. 18 is a perspective view of a standard golf club to which a second example of the pressure mapping and orientation sensing golf grip system has been applied.

The second example of the golf grip sensor system 10 is shown applied to the golf club 1 in FIG. 18.

Figure 19:
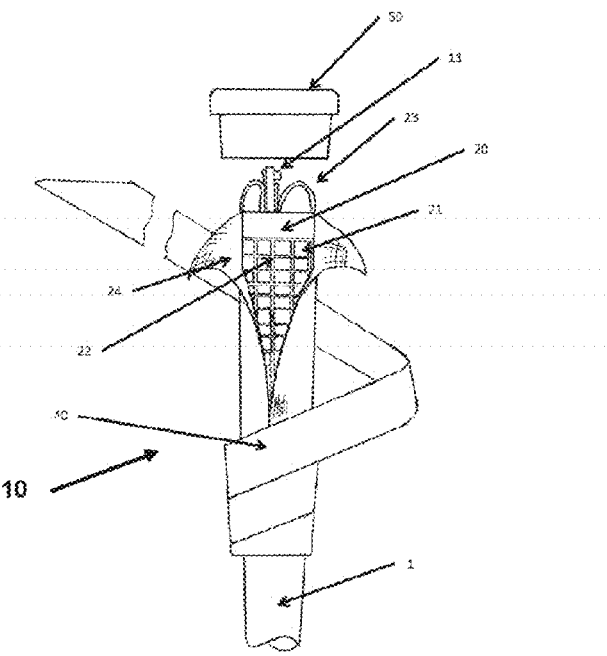
FIG. 19 is a partially disassembled side view of the hardware portion of the pressure mapping and orientation sensing golf grip system of FIG. 18.

As shown in FIG. 19, a golf club 1 having handle 10, can be fitted with a system of the present invention, such that control board 11 is disposed within the club shaft 1, and connected to the pressure sensor layer 20 by leads/connectors 23 which pass outside the club shaft 1 near the cap end 50. Piezo-resistive material 24 covers the electrode pads 21 and the optional spacers 22, such that the spacers bias the material 24 away from the electrodes 21. The grip wrap 40 covers the pressure sensor layer and is of appropriate thickness.

In order to prevent the layers from sliding, if the grip wrapping is insufficient, the pressure sensor layer 20 may be adhered to the club shaft 1, the optional spacers 22 may be formed directly on the FPCB with the electrode pads 21, and the spacers 22 adhered to the piezo-resistive material 24.

The grip 40 must not be too tight so as to fully compress the piezo-resistive material 24 against the electrodes 21, lest the pressure sensors not have sufficient range of operation.

In order to mimic as closely as possible the look and feel of a standard club (approximately 0.9" two inches down from the shaft for a male golfer, for instance), the outer layer 40 can be chosen such that the outer dimensions of the sensor array layer, any protective layers and the grip wrap outer layer combined are the same as a standard club grip dimensions. Alternatively, different sized outer layers may be used, and multiple clubs provided to golfers to examine the "fit of the club grips". Swing diagnostics provided from using multiple clubs with slightly different handles provide quantitative information by which golfers can select golf club grips suited to their natural grip styles.

Various shapes of sensor arrays may be used. The electrode array may have the general shape of FIG. 3, or may employ up to 2000 electrode pads resolved into 256 distinct sets using the rows, columns and squares approach of FIG. 6. Each lead 23 has 33 pins, defining a common ground terminal and 32 sets of electrode to be monitored. There are 8 leads, so 256 sets of electrodes defined by the rows columns and squares which can be monitored in this approach, so as to keep the device robust but light weight.

FIG. 6(b) shows a 20×100 sensor pad resolved into 256 individual sensor sets of rows, columns and squares, which may be appropriate in this application.

Within the tolerances of the examples shown, a PIC32 microprocessor on the control board 11 with an array of multiplexers 705 is used to read sensors and compute resistances. In the examples shown, the motion sensors are measured at approximately 500 Hz, and the pressure sensors are measured at dynamic rates between approximately 50 Hz and approximately 500 Hz based on activity on the sensors. Ranges from 0 Hz (non-sampling) to approximately 2000 Hz could be tolerated, limited primarily by the transmissions speeds for any required real time data transfer. A 3-axis gyroscope and accelerometer 706 using open-source orientation algorithm are used to measure the 3-Dimensional orientation of the golf club handle in real-time during a swing. Other known chip level gyroscopes, accelerometers, magnetometers, GPS or other location and orientation mechanisms may also be deployed on the microcontroller, with or without any self-calibration tools available.

Figure 20:
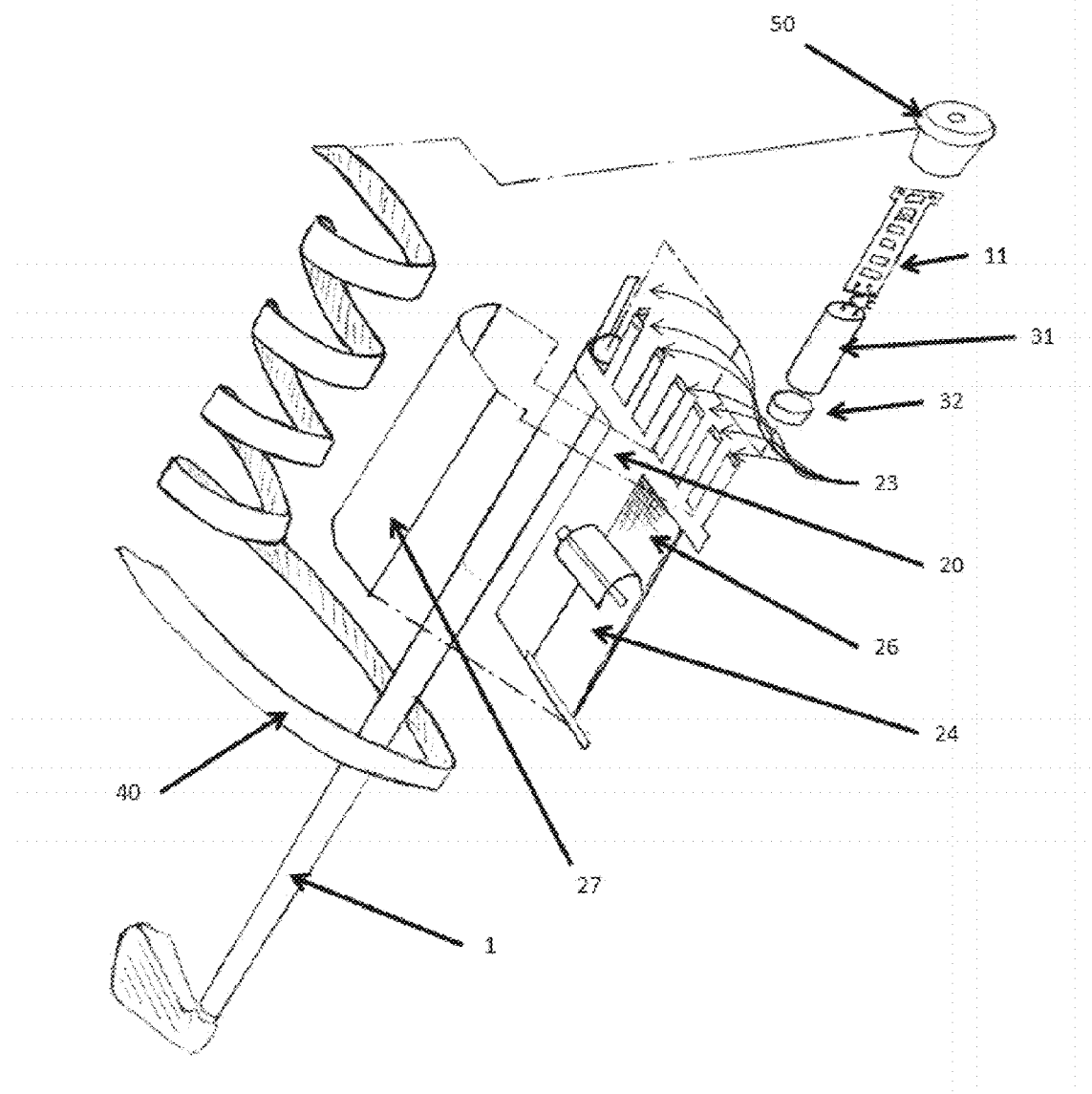
FIG. 20 is an exploded perspective view of the fully disassembled hardware portion of the pressure mapping and orientation sensing golf grip system of FIG. 18.
Figure 21:
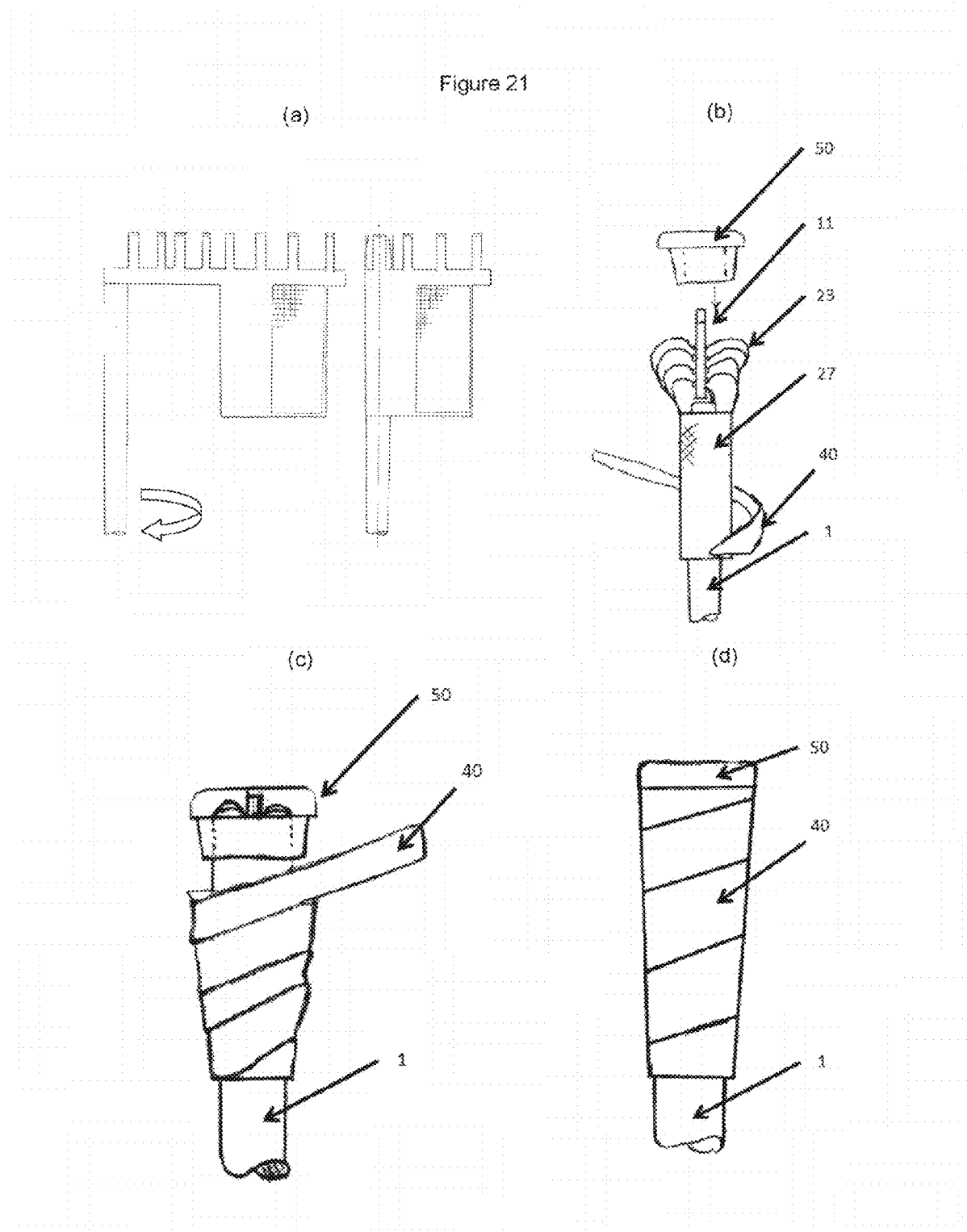
FIGS. 21 (a), (b), (c) and (d) are side views of the pressure mapping and orientation sensing golf grip hardware of FIG. 20 being assembled on a standard golf club.

FIG. 20 and FIG. 21 show how the hardware portion of the system can be assembled. At outer dimensions of 0.5"× 4.5", the control board 11 fits inside a standard golf shaft with a battery 31 and a plug 32 to keep the parts from moving during use. A FPCB 20 (8"×10") wraps four times around the shaft, with layers of wrapping adhered together to prevent twisting during use, such that the designed array is established on the golf club handle. The FPCB defines 8 flexible leads 23 for connection to the control board 11, an area for connector traces to be managed, and a sensor array area 26. Pressure sensing resistive material 24 covers the FPCB for contact with the sensors, and an optional protective layer 27 covers the pressure sensor layer beneath the grip wrap 40. Spacers 22 (shown in FIG. 19) may also be used to increase the size the initial state gap of the golf grip assembly, and thereby permit the grip wrap outer layer 40 to be wrapped more tightly without exceeding the pressure thresholds of the sensors. In another alternative, the pressure sensing resistive material 24 may be adhered along certain sensor electrode regions instead of spacers to prevent slippage. Although these regions would no longer be available to act as sensors, regions of lesser interest, or those already over sampled, may be selected in the design.

In one alternative, the pressure sensing resistive material 24 could be proximate to the golf shaft 1 and the sensor array FBCB 20 wrapped around it.

Figure 22:
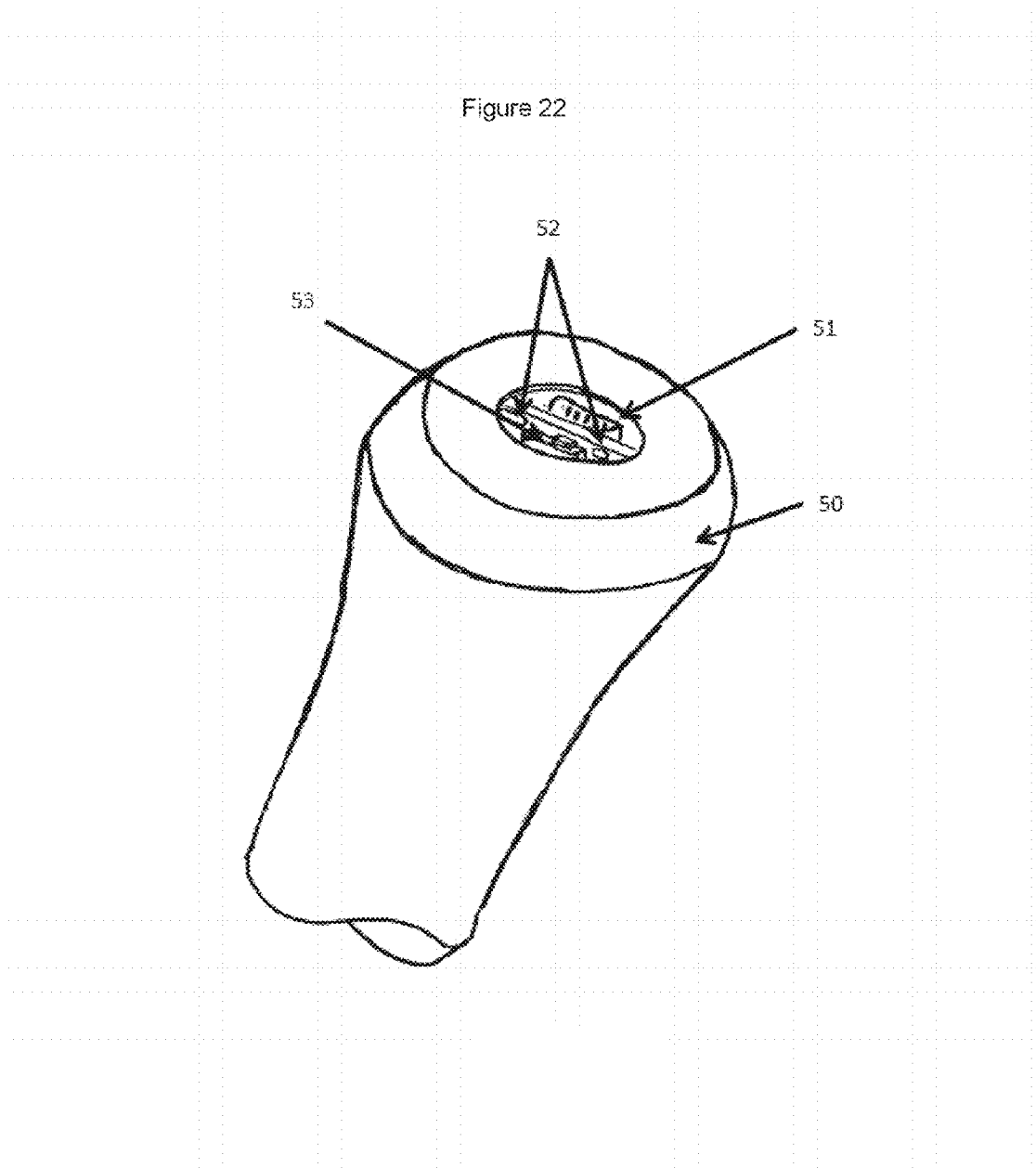
FIG. 22 is a perspective view of the top of a golf club of the present system, showing details of example control buttons, lights and connection circuitry.
Figure 23:
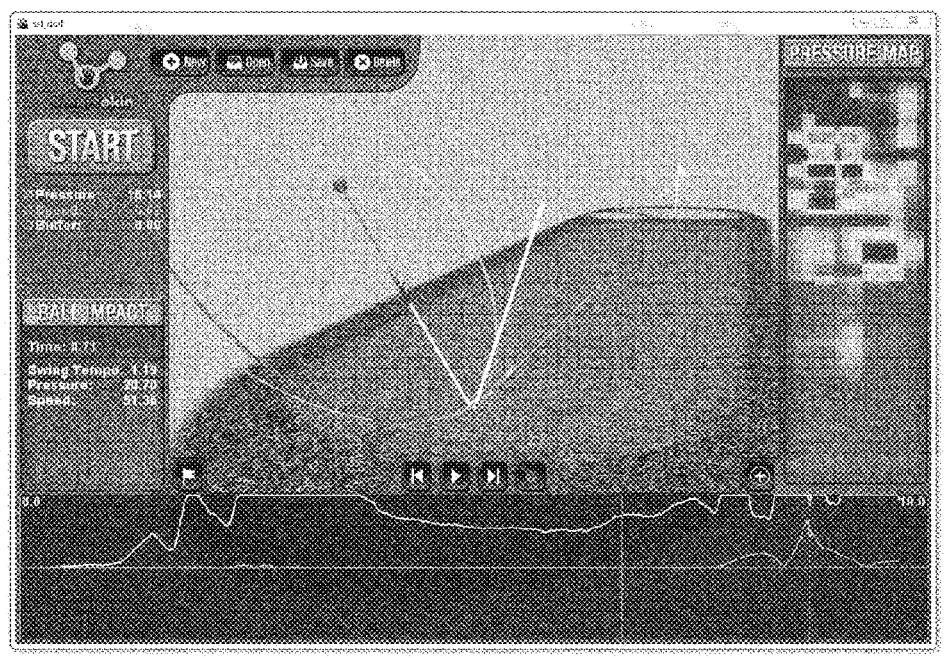
FIG. 23 is a screen shot of one graphical user interface of the system shown in FIG. 19, in which the full swing trajectory is shown, and the initial club position orientation and pressure map on the grip are displayed.
Figure 24:
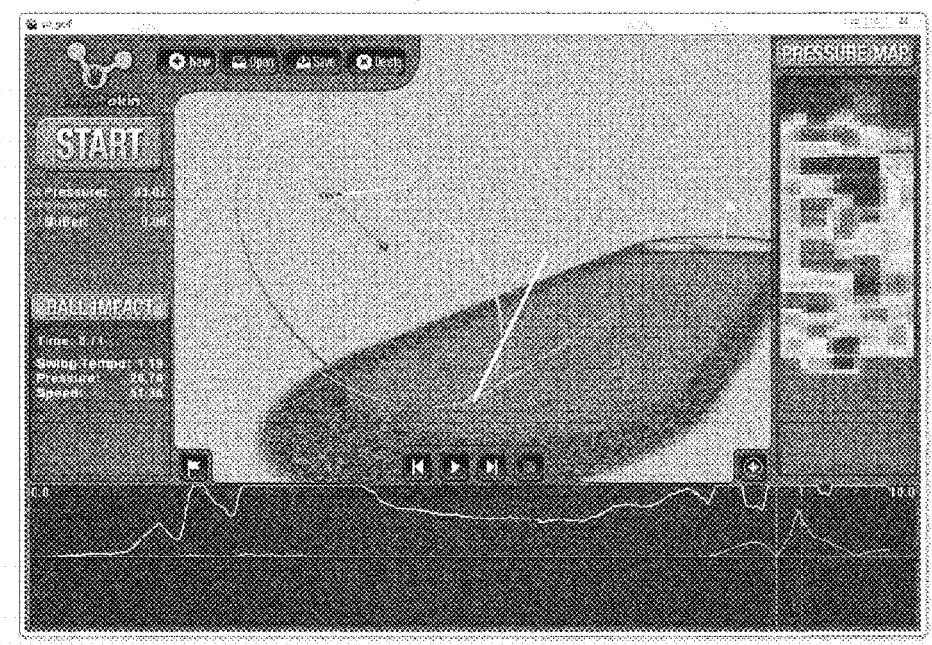
FIG. 24 is a screen shot of the system and swing in FIG. 23 in which the end of the back of swing is shown.
Figure 25:
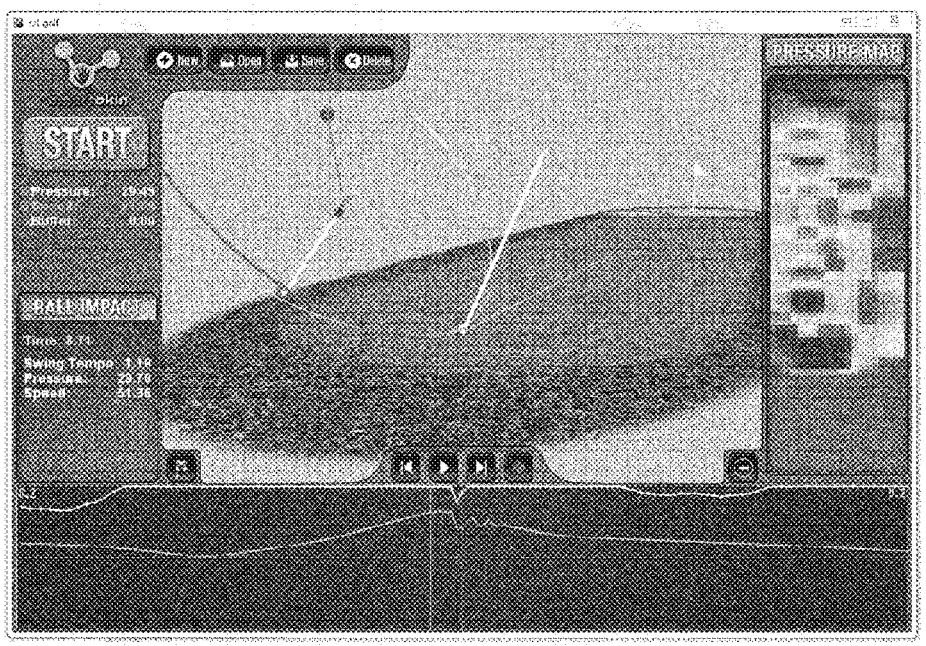
FIG. 25 is a screen shot of the system and swing in FIG. 23 in which the down swing is shown.
Figure 26:
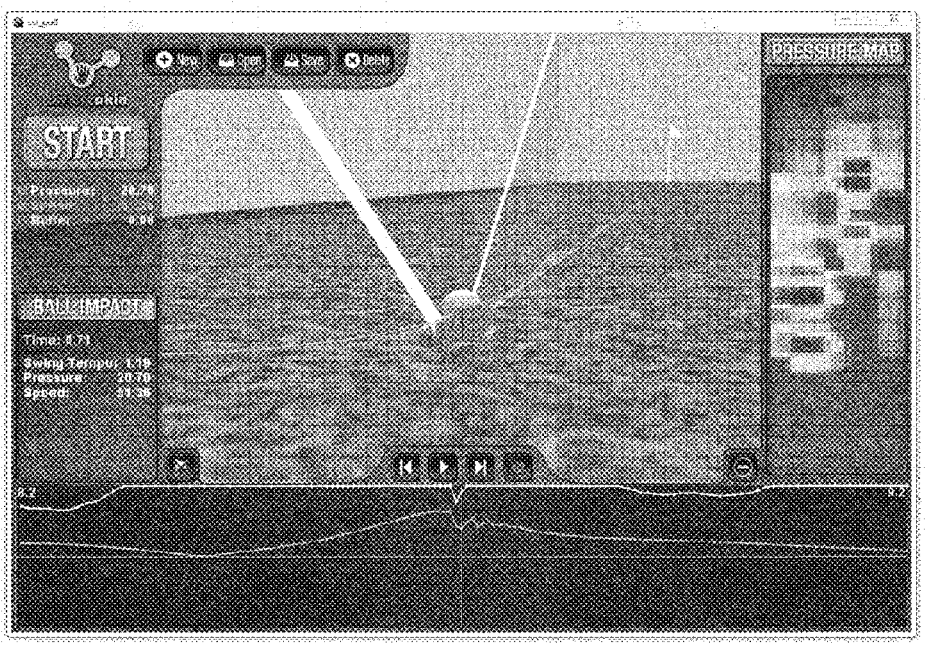
FIG. 26 is a screen shot of the system and swing in FIG. 23 in which a close up of the estimated ball strike position is shown.
Figure 27:
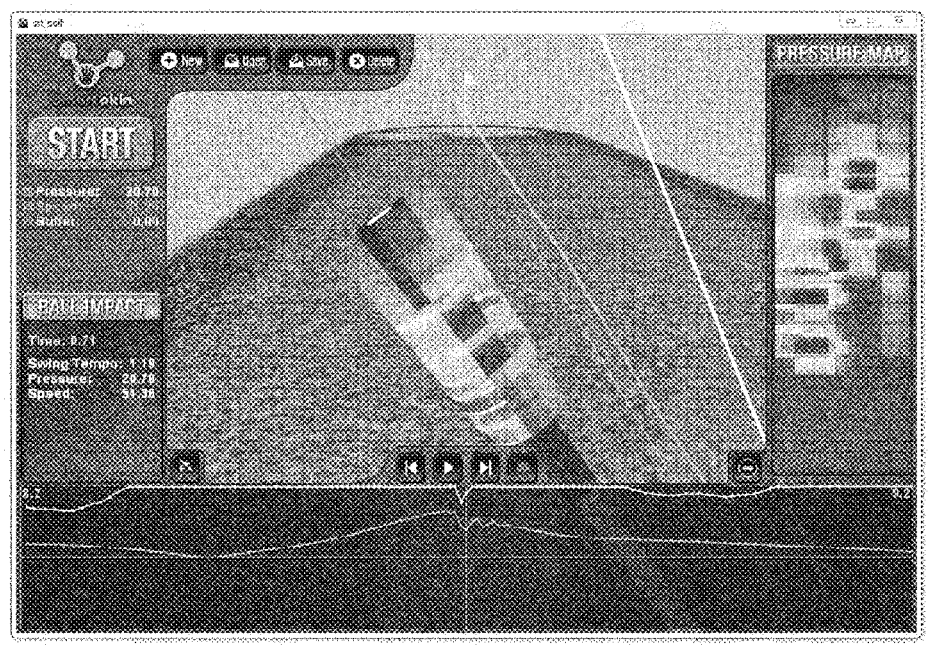
FIG. 27 is a screen shot of the system and swing in FIG. 23 in which a close up of the golf club grip at the time of the estimated ball strike position in FIG. 26.
Figure 28:
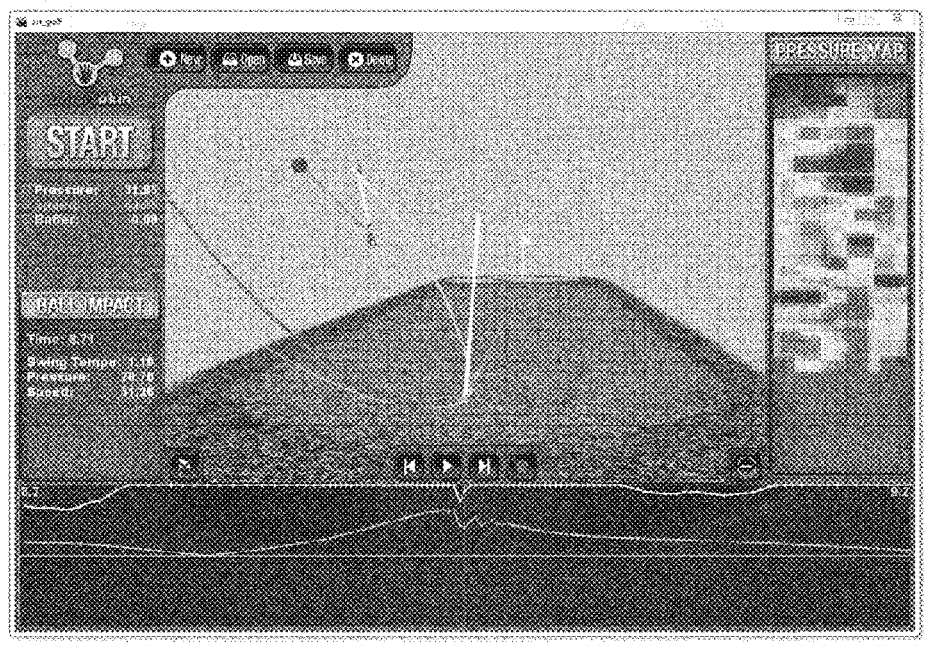
FIG. 28 is a screen shot of the system and swing in FIG. 23 in which the end of the follow through is shown.

FIG. 22 shows the cap end 50 with USB connection 51, LEDs 52 and power switch 53, all connected to the control board (not shown) beneath the cap.

FIG. 23 through FIG. 28 provide screen shots of another example of the user interface software, in which the pressure map can be displayed as a high resolution image or video, and specific regions where the user's hand has applied a force can be shown as high or low pressure ranges, and suggested improvements can be displayed along with the actual trajectory measured by the orientation sensors. The output data for such a video display can be determined from pressure sensor data in numerous way limited only by permutations of the sensor array, including without limitation by: a) averaging top and bottom half into a pair of single values, one for each hand, representing a simple model of each hand's pressure in the swing; b) regions of the hand (palm, each finger) can be individually mapped and analyzed; or c) the pressure map can be analyzed as an image, have improved resolution and accuracy, and data can be extracted from the sequence of images throughout the swing. The software may map a user's hand (palm and finger locations) to the pressure map to track the pressure applied and movement of each part of the hand during the swing, which can be automatically compared to other sources or be incorporated into the swing diagnostics to provide additional information on all facets of a golf swing.

Software reads data transmitted from the hardware portion of the system, for post-processing, pressure map computation, 3D display of model of shaft and grip pressure to user.

In addition to analysing motion of the club and mapping the grip pressure, the present device can be used to analyze grip pressure during the swings of various test clubs having differently shaped or sized grips, so as to determine on the basis of quantitative metrics, the most appropriate fit of golf club grips or other golf equipment for a player.

The foregoing embodiments and advantages are merely exemplary and are not to be construed as limiting the present invention. The present teaching can be readily applied to other types of manufacturing lines and sports equipment swung or held by a user (bats, racquets, video game controllers, etc.). Also, the description of the embodiments of the present invention is intended to be illustrative, and not to limit the scope of the claims, and many alternatives, modifications, and variations will be apparent to those skilled in the art.

The invention claimed is:

1. A pressure mapping system for measuring and analyzing forces applied to an object over time, the pressure mapping system comprising:
a pressure sensor comprising a plurality of electrode pads in an electrode array layer proximate to a pressure sensing material layer of piezo-resistive material, the plurality of electrode pads being formed upon a printed circuit board shaped for one or more exterior surfaces of the object, the plurality of electrode pads measuring forces on the pressure sensing material layer;
a plurality of multiplexers coupled to the plurality of electrode pads, wherein each electrode pad is coupled to only one multiplexer in the plurality of multiplexers;
an internal processor in communication with the plurality of multiplexers, the internal processor being configured to obtain measurements of the forces on the pressure sensing material layer from the printed circuit board, identify locations of the forces on the pressure sensing material layer, and transmit the measurements and the locations of the forces on the pressure sensing material layer as data over a network; and
an external processor configured to receive the data over the network, and analyze the data to generate diagnostic information relating to the measurements and the locations of the forces on the pressure sensing material layer.

2. The system of claim 1 wherein the internal processor further comprises one or more orientation sensors for obtaining orientation estimates of the object, and wherein the data comprises the orientation estimates, and the diagnostic information comprises estimated relative positions of the object over time.

3. The system of claim 1, wherein the piezo-resistive material is chosen from the set of piezo-resistive materials consisting of: fabrics coated with one or more conductive materials; conductive foams, nanotube based polymers, carbon black based polymers, and graphite doped plastics.

4. The system of claim 1, wherein a common ground terminal is connected to the piezo-resistive material and wherein the electrode pads measure the forces on the pressure sensing material layer by measuring impedance across the piezo-resistive material.

5. The system of claim 4, wherein sets of the electrode pads are connected as rows, sets of the electrode pads are connected as columns, and sets of the electrode pads are connected as squares, and wherein each of the plurality of electrode pads cannot be part of more than one set, and each set of rows, columns and squares is coupled to only one multiplexer in the plurality of multiplexers.

6. The system of claim 1, wherein electrical connections to the electrode pads are also formed upon the printed circuit board, and wherein the printed circuit board is flexible.

7. The system of claim 1, wherein one or more spacers are located upon the printed circuit board between the electrode pads so as to bias the pressure sensing material layer away from the electrode array layer.

8. The system of claim 7, wherein the one or more spacers are adhered to the pressure sensing material layer.

9. The system of claim 6, wherein tracings from eight groups of unconnected electrode pads form flexible leads on the flexible printed circuit board.

10. The system of claim 9, wherein the internal processor and the plurality of multiplexers are designed to be disposed within the object and the flexible leads further pass through an opening to a cavity within the object to couple the plurality of electrode pads to the plurality of multiplexers.

11. The system of claim 2, wherein the one or more orientation sensors are sampled at a motion sampling rate of between 0 Hz and 2000 Hz, and the electrode pads within the pressure sensor are sampled at a dynamic pressure sampling rate depending on activity of sensors of between 0 Hz and 2000 Hz.

12. The system of claim 1, wherein the external processor comprises a graphical user interface capable of displaying the estimated positions of the object over time and the estimated locations of forces on the pressure sensing layer on the object over time, as stills or video of a 3-dimensional representation of the object with the active pressure sensing layer upon it.

13. The system of claim 1 wherein the object is a container sized to model an industrial article on a manufacturing line.

14. The system of claim 1, wherein the object with the system applied to it has the same dimensions as a standard aluminum can, and the electrode array layer is adhered about the cylindrical surface of the can.

15. The system of claim 1, wherein the object with the system applied to it has the same dimensions as a standard bottle, and the electrode array layer is adhered about the cylindrical surface of the bottle.

16. The system of claim 1, wherein the object with the system applied to it has the same dimensions as a standard box, and the electrode array layer is adhered about all six surfaces of the box.

17. The system of claim 1, wherein the object is a container sized to model a container for transportation.

18. A pressure sensor for use in a pressure mapping system configured to measure forces applied to an object over time, the pressure sensor comprising:
- a plurality of electrode pads in an electrode array layer proximate to a pressure sensing material layer;
- wherein the plurality of electrode pads are formed upon a flexible printed circuit board shaped for one or more exterior surfaces of the object;
- wherein the plurality of electrode pads are configured to measure force on the pressure sensing material layer; and
- wherein the plurality of electrode pads are coupled to a processor via a plurality of multiplexers, wherein each electrode pad is coupled to only one multiplexer in the plurality of multiplexers.

19. The pressure sensor of claim 18, wherein:
the pressure sensing material layer comprises piezo-resistive material;
a common ground terminal is connected to the piezo-resistive material; and
the electrode pads measure the forces on the pressure sensing material layer by measuring impedance across the piezo-resistive material.

20. The pressure sensor of claim 18, wherein:
a first set of electrode pads in the plurality of electrode pads are connected as a row;
a second set of electrode pads in the plurality of electrode pads are connected as a column;
a third get of the electrode pads in the plurality of electrode pads are connected as a square;
each electrode pad in the of the plurality of electrode pads cannot be part of more than one of the first set, second set, and third set; and
each of the first set, second set, and third set is coupled to only one multiplexer in the plurality of multiplexers.

* * * * *

UNITED STATES PATENT AND TRADEMARK OFFICE
CERTIFICATE OF CORRECTION

Page 1 of 1

PATENT NO. : 9,488,538 B2
APPLICATION NO. : 14/375331
DATED : November 8, 2016
INVENTOR(S) : Kumaran Thillainadarajah, Arpad Kormendy and Adam Joseph MacDonald It is certified that error appears in the above-identified patent and that said Letters Patent is hereby corrected as shown below:

In the Claims

Claim 20, Column 18, Line 18, "a third get of the" should read -- a third set of the --

Signed and Sealed this
Eighth Day of August, 2017

Joseph Matal
*Performing the Functions and Duties of the*
*Under Secretary of Commerce for Intellectual Property and*
*Director of the United States Patent and Trademark Office*